United States Patent
Okazaki

(10) Patent No.: US 7,555,969 B2
(45) Date of Patent: Jul. 7, 2009

(54) JOINT DRIVING DEVICE

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 11/711,757

(22) Filed: Feb. 28, 2007

(65) Prior Publication Data
US 2007/0144299 A1  Jun. 28, 2007

Related U.S. Application Data

(63) Continuation of application No. PCT/JP2005/015902, filed on Aug. 31, 2005.

(30) Foreign Application Priority Data

Sep. 1, 2004  (JP)  .............................. 2004-254159

(51) Int. Cl.
*B25J 17/00* (2006.01)
(52) U.S. Cl. ........................ 74/490.05; 901/15; 901/22; 901/28; 901/29
(58) Field of Classification Search . 74/490.01–490.06; 901/15, 22, 28, 29
See application file for complete search history.

(56) References Cited

U.S. PATENT DOCUMENTS 5,351,602 A * 10/1994 Monroe .......................... 92/64

FOREIGN PATENT DOCUMENTS

| JP | 60-34288 | 2/1985 |
|---|---|---|
| JP | 61-184264 | 8/1986 |
| JP | 61-249292 | 11/1986 |
| JP | 7-24772 | 1/1995 |

* cited by examiner

*Primary Examiner*—Richard W L Ridley
*Assistant Examiner*—Terence Boes
(74) *Attorney, Agent, or Firm*—Wenderoth, Lind & Ponack, L.L.P.

(57) ABSTRACT

A first elastic body actuator and a second elastic body actuator are used for driving a first configuration member and a second configuration member to swing them with respect to each other. One end portion of the first elastic body actuator is secured to the first configuration member and the other end portion of the first elastic body actuator is secured to the second configuration member, and one end portion of the second elastic body actuator is secured to the first configuration member and the other end portion of the second elastic body actuator is secured to the second configuration member, such that the position at which the other end portion of the second elastic body actuator is secured to the second configuration member and the position at which the one end portion of the first elastic body actuator is secured to the second configuration member are substantially symmetric about a rotational joint. The interval between the portion of the first elastic body actuator, which is secured to the second configuration member, and the portion of the second elastic body actuator, which is secured to the second configuration member, is moved by a securing-position variable mechanism.

8 Claims, 22 Drawing Sheets

JOINT DRIVING DEVICE

This is a continuation application of International Application No. PCT/JP2005/015902, filed Aug. 31, 2005.

BACKGROUND OF THE INVENTION

The present invention relates to a joint driving device applicable to a joint mechanism for a mechanical apparatus such as a robot arm, and also relates to a robot arm including the joint driving device.

Elastic body actuators such as pneumatic artificial muscles can generate translation displacements, but can generate forces only in the direction of their contraction. Accordingly, when such an elastic body actuator is applied to a rotational joint mechanism for a movable mechanical apparatus such as a robot arm, an antagonistic driving mechanism as illustrated in FIGS. 14A and 14B is employed to realize rotational motions.

In FIGS. 14A and 14B, a numeral 57 denotes a first configuration member and a numeral 58 denotes a second configuration member. The first configuration member 57 and the second configuration member 58 are coupled to each other through a rotational joint 59 and, therefore, they can be relatively rotated with respect to each other. Actuator supporting members 60a and 60b are placed on the first configuration member 57 such that they face each other, while an actuator driving-force transfer member 61 is placed on the second configuration member 58.

Numerals 62a and 62b denote elastic body actuators which are placed such that they are in parallel with the first configuration member 57 and sandwich the first configuration member 57. The elastic body actuators 62a and 62b are coupled to the actuator supporting members 60a and 60b, respectively, through rotation joints 63a and 63b. Further, the elastic body actuators 62a and 62b are coupled to the actuator driving-force transfer member 61 through rotation joints 63c and 63d, respectively, which enables rotational motion about the rotational joint 59 with the contraction of the elastic body actuators 62a and 62b.

With the antagonistic driving mechanism of FIGS. 14A and 14B, when the rotation shaft is rotated, as in the cases of FIGS. 14A and 14B, for example, the angle α between the elastic body actuator 62a and the actuator driving-force transfer member 61 as a coupling supporting member is different between when the rotational angle θ is smaller and when the rotational angle θ is greater. Accordingly, even when the elastic body actuators generate a certain translational force, the rotational torque applied to the rotation shaft is varied depending on the rotational angle θ. Further, even when the elastic body actuators generate a certain translation displacement, the rotational displacement of the rotational shaft is varied depending on the rotational angle θ. Specifically, when the rotational angle θ is greater, a smaller rotational torque is generated and a smaller rotational displacement is generated, in comparison with cases where the rotational angle θ is smaller.

Further, as the portion designated by an arrow as a symbol A in FIG. 14B, when the rotational angle θ is greater, the interval between the elastic body actuators is reduced, which causes the end portion of the elastic body actuator 62a or 62b to come into contact with the first configuration member 57, thereby causing the issue of reduction of the movable range of the rotational angle θ.

To cope with the aforementioned issue, in the prior art, Patent Document 1 (Japanese Unexamined Patent Publication No. 07-24772) provides a wire/pulley driving configuration capable of generating a constant rotational torque regardless of the rotational angle θ with a certain translational force generated from elastic body actuators and also capable of generating a constant rotational displacement regardless of the rotational angle θ with a certain translation displacement of the elastic body actuators.

Further, with the configuration of Patent Document 1, it is possible to place an intermediate pulley for placing the elastic body actuators in parallel with each other even if the pulley diameter is smaller, which prevents the elastic body actuators from coming into contact with each other, thereby preventing the movable range from being restricted.

However, the aforementioned configuration of Patent Document 1 may induce looseness of wires and fall from the pulleys, which may reduce the control accuracy or may make it impossible to perform operations.

Further, the aforementioned configuration is capable of generating only a certain rotational torque with a certain translational force generated from the elastic body actuators. Therefore, when the aforementioned configuration is applied to a robot and the like, the configuration is not capable of generating variable torques with a certain translational force depending on the situation, such as situations which require a greater force for griping an object with a greater weight and situations which require a greater operable range for operating the robot over a wider range.

It is an object of the present invention to provide a joint driving device and to provide a robot arm including the aforementioned joint driving device, with higher reliability and higher flexibility which can overcome the aforementioned issues of conventional joint mechanisms, can eliminate the issues of looseness of wires and fall from pulleys and the like, and can generate variable torques depending on the situation with a certain translational force generated from elastic body actuators.

SUMMARY OF THE INVENTION

In order to attain the aforementioned object, the present invention provides the following configurations.

According to one aspect of the present invention, there is provided a joint driving device including;

a first configuration member;

a second configuration member which is coupled to the first configuration member through a rotational joint and is relatively movable with respect to the first configuration member;

a first elastic body actuator, one end portion of which is secured to the first configuration member, and the other end portion of which is secured to the second configuration member;

a second elastic body actuator, one end portion of which is secured to the first configuration member and the other end portion of which is secured to the second configuration member, such that a position at which the other end portion of the second elastic body actuator is secured to the second configuration member and a position at which the other end portion of the first configuration member is secured to the second configuration member are substantially symmetric about the rotational joint; and a securing-position variable mechanism for changing an interval between a position of the first elastic body actuator which is secured to the second configuration member and a position of the second elastic body actuator which is secured to the second configuration member.

According to another aspect of the present invention, there is provided a joint driving device including;

a first configuration member;

a second configuration member which is coupled to the first configuration member through a rotational joint and is relatively movable with respect to the first configuration member;

an elastic body actuator, one end portion of which is secured to the first configuration member;

a motion restricting portion which is placed to couple the movable end portion of the elastic body actuator opposite from the fixed end portion thereof to the first configuration member and has a degree of freedom for motions at least in a direction of expansion and contraction of the elastic body actuator; and a coupling portion for coupling the movable end portion of the elastic body actuator to the second configuration member.

According to the present invention, there is provided the securing-position variable mechanism to enable controlling the interval between the elastic body actuators, which enables flexibly and continuously switching between the operation which prioritizes the rotational torque and the operation which prioritize the rotational displacement, depending on the situation. Accordingly, when the robot arm is constituted by the joint driving device according to the present invention, it is possible to realize the robot arm with higher reliability capable of flexibly varying the characteristics such as generating higher outputs or increasing the operable range depending on the situation as follows. For example, it is possible to realize a robot arm capable of generating a greater torque for griping and capable of carrying an object with a greater weight and also capable of providing a greater movable range of the joint for providing a greater operable range.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
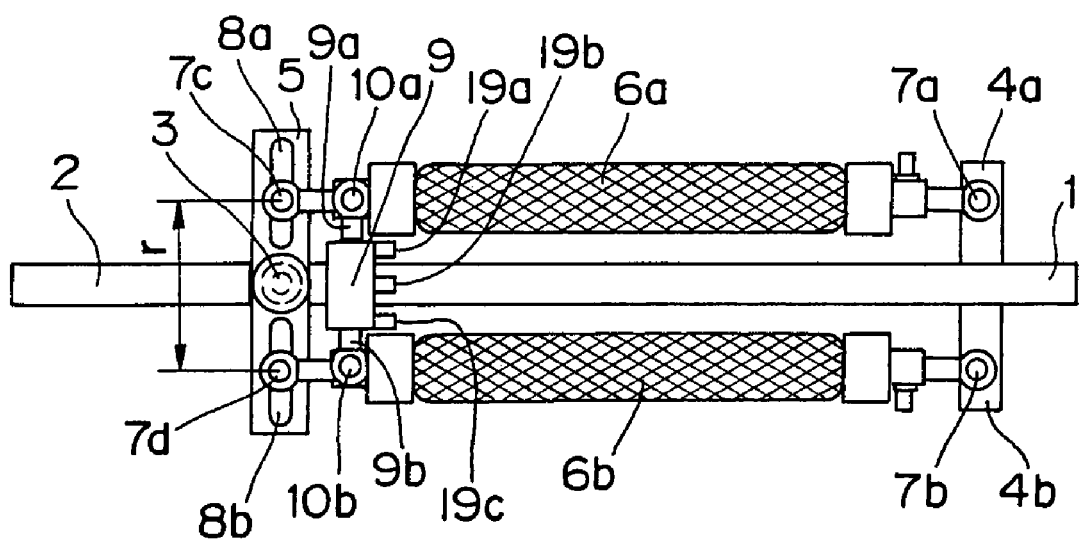
FIG. 1 is a view illustrating a configuration of a joint driving device according to a first embodiment of the present invention.

Before the description of the present invention proceeds, it is to be noted that like parts are designated by like reference numerals throughout the accompanying drawings.

Hereinafter, various types of aspects of the present invention will be described before the detailed description of embodiments of the present invention based on the drawings.

According to a first aspect of the present invention, there is provided a joint driving device comprising:

a first configuration member;

a second configuration member which is coupled to the first configuration member through a rotational joint and is relatively movable with respect to the first configuration member;

a first elastic body actuator, one end portion of which is secured to the first configuration member and the other end portion of which is secured at to the second configuration member;

a second elastic body actuator, one end portion of which is secured to the first configuration member and the other end portion of which is secured to the second configuration member, such that a position at which the other end portion of the second elastic body actuator is secured to the second configuration member and a position at which the other end portion of the first elastic body actuator is secured to the second configuration member are substantially symmetric about the rotational joint; and a securing-position variable mechanism for changing an interval between a position of the first elastic body actuator which is secured to the second configuration member and a position of the second elastic body actuator which is secured to the second configuration member.

According to a second aspect of the present invention, there is provided the joint driving device according to the first aspect, wherein the securing-position variable mechanism changes the interval between the position of the first elastic body actuator which is secured to the second configuration member and the position of the second elastic body actuator which is secured to the second configuration member to change a rotational torque generated between the first configuration member and the second configuration member.

According to a third aspect of the present invention, there is provided the joint driving device according to the first aspect, wherein the securing-position variable mechanism changes the interval between the position of the first elastic body actuator which is secured to the second configuration member and the position of the second elastic body actuator which is secured to the second configuration member to change a rotational angle generated between the first configuration member and the second configuration member.

According to a fourth aspect of the present invention, there is provided the joint driving device according to the second aspect, further comprising a control device for controlling the securing-position variable mechanism to change the interval between the position of the first elastic body actuator which is secured to the second configuration member and the position of the second elastic body actuator which is secured to the second configuration member to change the rotational torque generated between the first configuration member and the second configuration member.

According to a fifth aspect of the present invention, there is provided the joint driving device according to the third aspect, further comprising a control device for controlling the securing-position variable mechanism to change the interval between the position of the first elastic body actuator which is secured to the second configuration member and the position of the second elastic body actuator which is secured to the second configuration member to change the rotational angle generated between the first configuration member and the second configuration member.

According to a sixth aspect of the present invention, there is provided the joint driving device according to the first aspect, wherein the securing-position variable mechanism comprises a securing-position guide mechanism for respectively guiding the secured position of the first elastic body actuator and the secured position of the second elastic body actuator in a longitudinal direction of the first configuration member, and a securing-position driving actuator for respectively causing backward-and-forward motions of the secured position of the first elastic body actuator and the secured position of the second elastic body actuator, while guiding them with the securing-position guide mechanism, to change the interval between the secured position of the first elastic body actuator and the secured position of the second elastic body actuator.

According to a seventh aspect of the present invention, there is provided the joint driving device according to the first aspect, wherein the securing-position variable mechanism comprises a securing-position guide mechanism for respectively guiding the secured position of the first elastic body actuator and the secured position of the second elastic body actuator in a longitudinal direction of the first configuration member, and a securing-position moving cam mechanism for respectively moving the secured position of the first elastic body actuator and the secured position of the second elastic body actuator, while guiding them with the securing-position guide mechanism, to change the interval between the secured position of the first elastic body actuator and the secured position of the second elastic body actuator.

According to an eighth aspect of the present invention, there is provided the joint driving device according to the seventh aspect, wherein the securing-position moving cam mechanism comprises a cam, a pair of cam followers for keeping in contact with the cam and rotatably supporting the position at which the first elastic body actuator is secured and the position at which the second elastic body actuator is secured, and a contact holding spring for biasing the cam followers to keep them in contact with the cam, wherein the pair of cam followers are moved while being kept in contact with the cam to change the interval between the secured position of the first elastic body actuator and the secured position of the second elastic body actuator.

According to a ninth aspect of the present invention, there is provided the joint driving device according to the eighth aspect, wherein the securing-position moving cam mechanism further comprises a cam driving actuator for rotating the cam, wherein the pair of cam followers which are kept in contact with the cam are moved through rotation of the cam to change the interval between the secured position of the first elastic member and the secured position of the second elastic body actuator.

According to a tenth aspect of the present invention, there is provided a joint driving device comprising:

a first configuration member;

a second configuration member which is coupled to the first configuration member through a rotational joint and is relatively movable with respect to the first configuration member;

an elastic body actuator, one end portion of which is secured to the first configuration member;

a motion restricting portion which is arranged at a movable end portion of the elastic body actuator opposite from the fixed end portion thereof to couple the movable end portion to the first configuration member and has a degree of freedom for motions at least in a direction of expansion and contraction of the elastic body actuator; and a coupling portion for coupling the movable end portion of the elastic body actuator to the second configuration member.

According to an eleventh aspect of the present invention, there is provided a joint driving device comprising:

a first configuration member;

a second configuration member which is coupled to the first configuration member through a rotational joint and is relatively movable with respect to the first configuration member;

an elastic body actuator, one end portion of which is secured to the first configuration member;

a rod-shaped member coupled to the movable end portion of the elastic body actuator opposite from the fixed end portion thereof;

a motion restricting portion which is arranged to couple the rod-shaped member to the first configuration member and has a degree of freedom for motions at least in a direction of expansion and contraction of the elastic body actuator; and a coupling portion for coupling the variable end portion of the elastic body actuator to the second configuration member.

According to a twelfth aspect of the present invention, there is provided the joint driving device according to the tenth aspect, wherein the motion restricting portion is a linear guide having only a single translational degree of freedom.

According to a thirteenth aspect of the present invention, there is provided the joint driving device according to the tenth aspect, wherein the motion restricting portion is a linear bush mechanism having a single translational degree of freedom and a single rotational degree of freedom about the single translational degree of freedom.

According to a fourteenth aspect of the present invention, there is provided a robot arm including the joint driving device according to the first aspect.

Hereinafter, the embodiments of the present invention will be described in detail on the basis of the drawings.

First Embodiment

FIG. 1 is an overall view illustrating the configuration of a joint driving device according to a first embodiment of the present invention. In FIG. 1, numeral 1 denotes a rod-shaped first configuration member and numeral 2 denotes a rod-shaped second configuration member. The first configuration member 1 and the second configuration member 2 are coupled to each other at their one ends through a rotational joint 3 so that the first configuration member 1 and the second configuration member 2 are rotatable relative to each other. A pair of plate-shaped actuator supporting members 4a and 4b are placed on the other end of the first configuration member 1, such that the plate-shaped actuator supporting members 4a and 4b are located along the direction orthogonal to the axial direction of the first configuration member 1 and opposite to each other. Near one end of the second configuration member 2, there is placed a single plate-shaped actuator driving-force transfer member 5, along the direction orthogonal to the axial direction of the second configuration member 2.

Numerals 6a and 6b denote elastic body actuators which are placed substantially in parallel with the longitudinal direction of the first configuration member 1 and substantially symmetrical about the first configuration member 1 so as to sandwich the first configuration member 1 thereby. The elastic body actuators 6a and 6b are coupled at their one ends to the actuator supporting members 4a and 4b through rotation joints 7a and 7b. Further, the elastic body actuators 6a and 6b are coupled at their other ends to the actuator driving-force transfer member 5 through rotation joints 7c and 7d. The coupling portions between the rotation joints 7c and 7d and the actuator driving-force transfer member 5 are configured to be slidable along long groove holes 8a and 8b extending outwardly from the vicinity of the center shaft of the rotational joint 3.

Figure 2A:
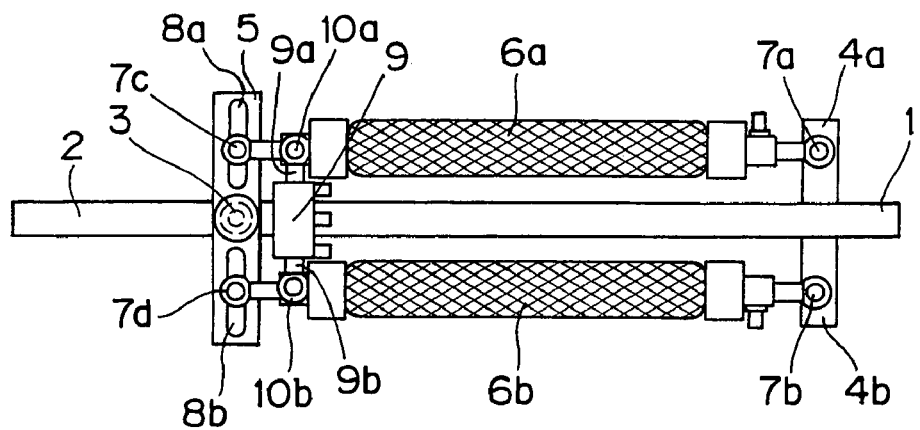
FIG. 2A is a view illustrating an operation of the joint driving device according to the first embodiment of the present invention.

Reference numeral 9 denotes an interval control actuator placed along the direction orthogonal to the longitudinal direction of the first configuration member 1 near the one end of the first configuration member 1. Extendable/retractable piston rods 9a and 9b protruding from the opposite sides of the interval control actuator 9 are coupled at their tip ends to the elastic body actuators 6a and 6b through rotation joints 10a and 10b. When the interval control actuator 9 is operated, the piston rods 9a and 9b are extended from the state of FIG. 2A to the state of FIG. 2B, so that the rotation joints 7c and 7d are moved outwardly within the long groove holes 8a and 8b, thereby changing the interval r between the elastic body actuators 6a and 6b (more specifically, the interval r between the rotation axes of the rotation joints 7c and 7d for the elastic body actuators 6a and 6b coupled to the actuator driving-force transfer member 5).

Figure 3A:
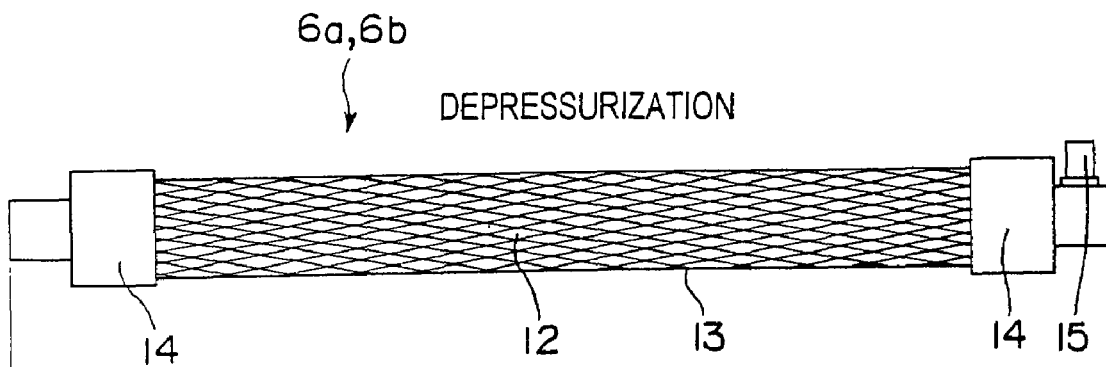
FIG. 3A is a side view illustrating the configuration of a pneumatic artificial muscle as one example of a tubular-shaped elastic member when the space within the pneumatic artificial muscle is depressurized.
Figure 3B:
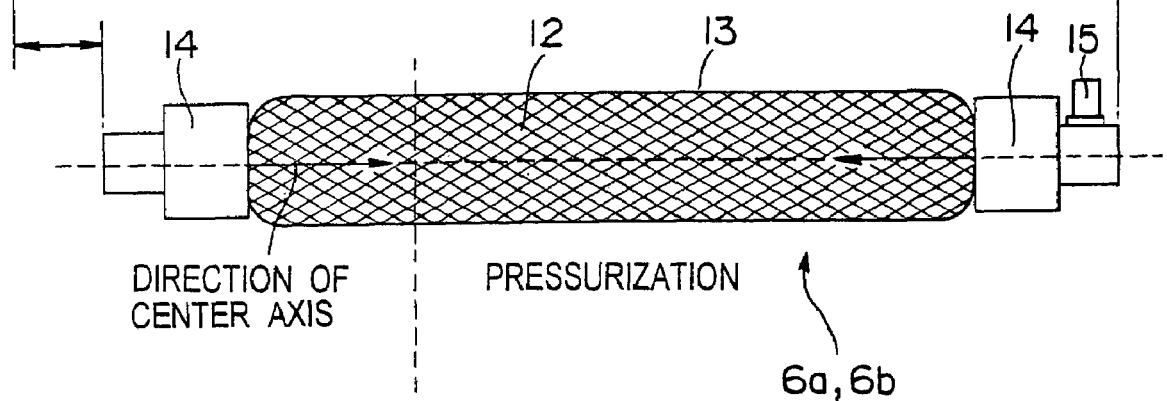
FIG. 3B is a side view illustrating the configuration of the aforementioned pneumatic artificial muscle as one example of the tubular-shaped elastic member when the space within the pneumatic artificial muscle is pressurized.
Figure 3C:
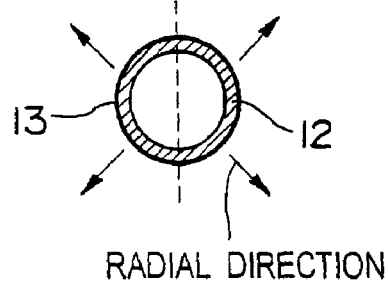
FIG. 3C is a cross-sectional view illustrating the configuration of the aforementioned pneumatic artificial muscle as one example of the tubular-shaped elastic member when the space within the pneumatic artificial muscle is pressurized, illustrating the portion designated by a dotted line in FIG. 3B.

FIGS. 3A, 3B, and 3C are views illustrating the configuration of a pneumatic artificial muscle as an example of the elastic body actuators 6a and 6b. As illustrated in FIGS. 3A, 3B, and 3C, the pneumatic artificial muscle is configured to include a tubular-shaped elastic member 12 made of a rubber material, a constraint member 13 made of fiber codes which is provided on the outer surface of the tubular-shaped elastic member 12, and sealing members 14 which hermetically seal the opposite end portions of the tubular-shaped elastic member 12. As illustrated in FIGS. 3B and 3C, if a compressable fluid such as air is supplied to the inside of the tubular-shaped elastic member 12 through a fluid injecting/ejecting member 15 to apply an internal pressure to the space within the tubular-shaped elastic member 12, then the tubular-shaped elastic member 12 tries to expand mainly in the radial direction, but the expansion of the tubular-shaped elastic member 12 is converted into movement of the tubular-shaped elastic member 12 in the direction of the center axis thereof due to the effect of the constraint member 13, thereby reducing the entire length. On the contrary, as illustrated in FIG. 3A, if the compressable fluid such as air is ejected from the tubular-shaped elastic member 12 through the fluid injecting/ejecting member 15 to reduce the internal pressure of the space within the tubular-shaped elastic member 12, then the tubular-shaped elastic member 12 is contracted in the radial direction and, also, the entire length of the center axis of the tubular-shaped member 12 is increased in the direction of the center axis thereof due to the elastic force of the tubular-shaped elastic member 12 itself. Since the pneumatic artificial muscle is mainly made of an elastic member, the pneumatic artificial muscle has characteristics of a flexible, safe, and lightweight actuator.

Figure 4:
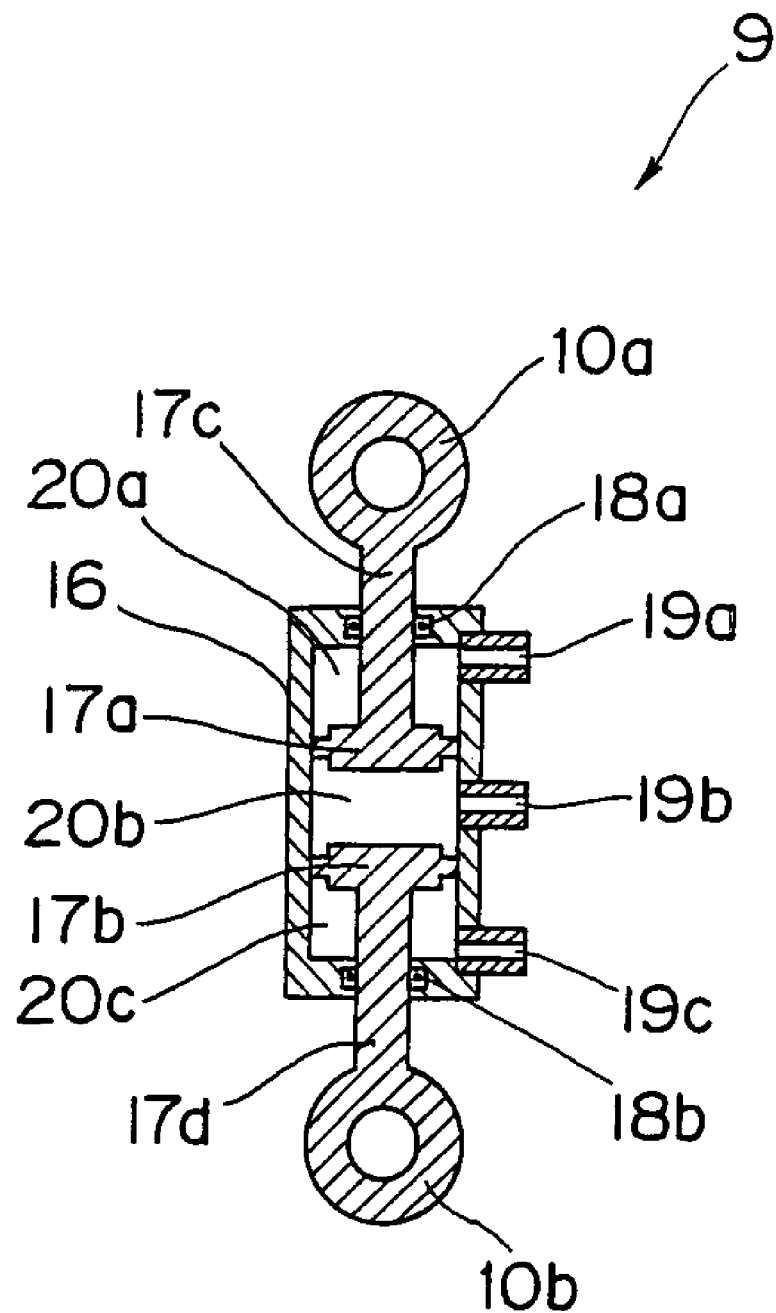
FIG. 4 is a cross-sectional view illustrating the configuration of an interval control actuator.

FIG. 4 is a cross-sectional view illustrating the configuration of the interval control actuator 9. In FIG. 4, reference numeral 16 denotes a cylinder, numerals 17a and 17b denote pistons which slide within the cylinder 16, wherein the end surface portions of the rods 17c and 17d of the pistons 17a and 17b which are positioned outside of the cylinder 16 form housings for the rotation joints 10a and 10b. Further, O-rings 18a and 18b are placed between the cylinder 16 and the rods 17c and 17d of the pistons 17a and 17b, so that the O-rings 18a and 18b hermetically seal the cylinder 16 and the pistons 17a and 17b such that the cylinder 16 and the pistons 17a and 17b are relatively slidable. At the upper end portion, the middle portion, and the lower end portion of the cylinder 16 in FIG. 4, there are placed fluid injecting/ejecting members 19a, 19b, and 19c, which enables supplying a fluid such as air to the cylinder chamber 20a between the piston 17a and the upper end portion of the cylinder 16 in FIG. 4 through the fluid injecting/ejecting member 19a, to the cylinder chamber 20b between the piston 17a and the piston 17b through the fluid injecting/ejecting member 19b, and to the cylinder chamber 20c between the piston 17b and the lower end portion of the cylinder 16 in FIG. 4 through the fluid injecting/ejecting member 19c. In the interval control actuator 9 having the aforementioned configuration, if the pressures within the cylinder chambers 20a, 20b, and 20c are made equal to one another, this causes the pistons 17a and 17b to be at rest. On the other hand, if the pressures within the cylinder chambers 20a and 20c are made equal to each other while the pressure within the cylinder chamber 20b is made lower than the pressure within the cylinder chambers 20a and 20c, this causes the pistons 17a and 17b to move in such a direction that the interval between the rotation joints 10a and 10b is reduced (namely, in such a direction that the pistons 17a and 17b become closer to each other). On the contrary, if the pressures within the cylinder chambers 20a and 20c are made equal to each other while the pressure of the cylinder chamber 20b is made higher than the pressure within the cylinder chambers 20a and 20c, this causes the pistons 17a and 17b to move in such a direction that the interval between the rotation joints 10a and 10b is increased (namely, in such a direction that the pistons 17a and 17b are separated from each other). As described above, by controlling the pressures within the cylinder chambers 20a, 20b, and 20c, it is possible to operate the interval control actuator 9 to change the interval r between the elastic body actuators 6a and 6b.

Accordingly, in the first embodiment, one example of the securing-position variable mechanism is constituted by a securing-position driving actuator mechanism including, for example, the interval control actuator 9 and the rotation joints 10a and 10b, and the like, and a securing-position guide mechanism including, for example, the long groove holes 8a and 8b, the rotation joints 7c and 7d, and the like.

Figure 5:
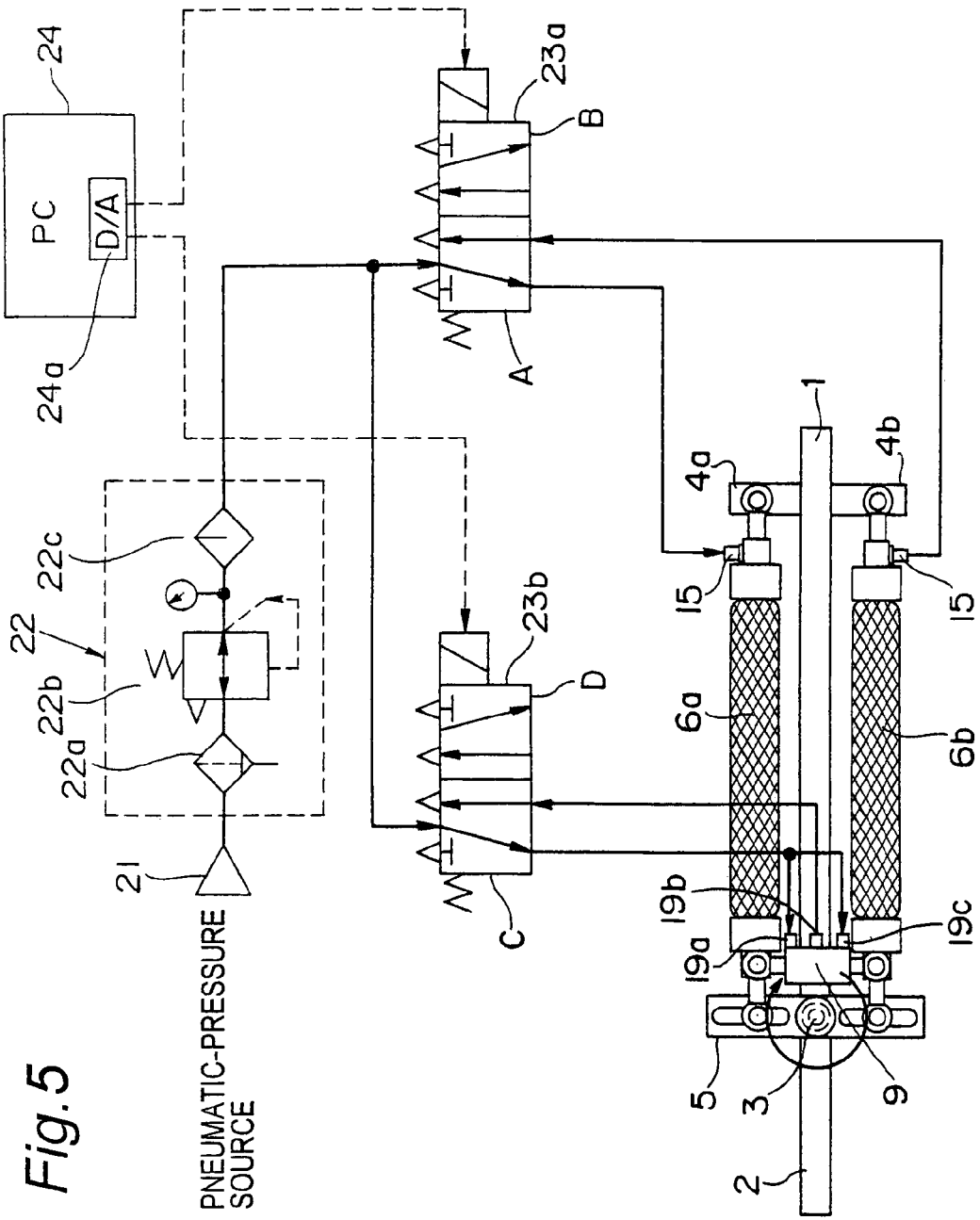
FIG. 5 is a view illustrating the structure of a pneumatic-pressure supply driving system for driving the aforementioned pneumatic artificial muscle.

FIG. 5 is a view illustrating the structure of a pneumatic-pressure supply driving system for driving the pneumatic artificial muscles 6a and 6b and the interval control actuator 9. In FIG. 5, numeral 21 denotes a pneumatic-pressure source such as a compressor, and numeral 22 denotes a pneumatic-pressure control unit constituted by a set of a pneumatic-pressure filter 22a for the pneumatic-pressure source 21, a pneumatic-pressure reducing valve 22b and a pneumatic-pressure lubricator 22c. Numerals 23a and 23b are 5-port flow-rate controlling solenoid valves which control the flow rate by, for example, driving spool valves with forces of electromagnets. Reference numeral 24 denotes a control computer as one example of the control device constituted by, for example, a common personal computer, wherein the control computer 24 incorporates a D/A board 24a and is capable of controlling the flow rates of air flowing through the fluid injecting/ejecting member 15 and 19a, 19b, and 19c by outputting voltage command values to the 5-port flow-rate controlling solenoid valves 23a and 23b.

With the pneumatic-pressure supply driving system illustrated in FIG. 5, the pneumatic-pressure source 22 creates high-pressure air, and the pneumatic-pressure control unit 22 depressurizes the high-pressure air, controls the pressure thereof to a constant pressure of, for example, 600 kPa, and supplies the pressure-controlled air to the 5-port flow-rate controlling solenoid valves 23a and 23b. The openings of the 5-port flow-rate controlling solenoid valves 23a and 23b are controlled to be proportional to the voltage command values output through the D/A board 24a from the control computer 24. The fluid injecting/ejecting members 15 of the respective tubular-shaped elastic members 12 of the pair of pneumatic artificial muscles 6a and 6b are connected to the 5-port flow-rate controlling solenoid valve 23a.

As described above, the pair of pneumatic artificial muscles 6a and 6b are arranged substantially in parallel with the longitudinal direction of the first configuration member 1, and the respective tubular-shaped elastic members 12 are secured, at their end portions near the fluid injecting/ejecting members 15, to the actuator supporting members 4a and 4b secured to an end portion of the first configuration member 1. The actuator driving-force transfer member 5 which is rotatably supported on the first configuration member 1 through the rotational joint 3 is supported on the other end portions of the tubular-shaped elastic members 12 of the pair of pneumatic artificial muscles 6a and 6b, and the other end portions of the tubular-shaped elastic members 12 of the pair of pneumatic artificial muscles 6a and 6b are rotatably supported on the actuator driving-force transfer member 5. Accordingly, as will be described later, when the tubular-shaped elastic members 12 of the pair of pneumatic artificial muscles 6a and 6b are expanded and contracted, the actuator driving-force transfer member 5 is driven to be rotated in the normal and reverse directions about the rotational joint 3, thereby driving the second configuration member 2 to rotate the second configuration member 2 in the normal and reverse directions about the rotational joint 3. Further, the clockwise rotation designated by an arrow in FIG. 5 will be referred to as a normal direction, while the counter-clockwise rotation opposite from the arrow will be referred to as a reverse direction.

If a positive voltage command value is input to the 5-port flow-rate controlling solenoid valve 23a from the control computer 24 through the D/A board 24a, this causes the 5-port flow-rate controlling solenoid valve 23a to be switched to a state designated by a pneumatic-pressure circuit symbol A in FIG. 5, which causes the flow path from the pneumatic-pressure source 21 to the fluid injecting/ejecting member 15 of the tubular-shaped elastic member 12 of the pneumatic-pressure artificial muscle 6a to be opened through the 5-port flow-rate controlling solenoid valve 23a, thereby supplying air to the pneumatic-pressure artificial muscle 6a at a flow rate proportional to the absolute value of the voltage command value. On the other hand, on the pneumatic-pressure artificial muscle 6b-side, the flow path from the fluid injecting/electing member 15 of the tubular-shaped elastic member 12 of the pneumatic-pressure artificial muscle 6b to the atmospheric pressure is opened through the 5-port flow-rate controlling solenoid valve 23a, thereby discharging air from the pneumatic-pressure artificial muscle 6b to the atmosphere at a flow rate proportional to the absolute value of the voltage command value. Accordingly, the entire length of the pneumatic-pressure artificial muscle 6a is reduced (see FIG. 3B) while the entire length of the pneumatic-pressure artificial muscle 6b is increased (see FIG. 3A), which causes a clock-wise rotational motion of the rotational joint 3, as designated by the arrow in FIG. 5, at a velocity proportional to the absolute value of the voltage command value.

On the other hand, if a negative voltage command value is input to the 5-port flow-rate controlling solenoid valve 23a from the control computer 24 through the D/A board 24a, this causes the 5-port flow-rate controlling solenoid valve 23a to be switched to a state designated by an pneumatic-pressure circuit symbol B, which causes the pneumatic-pressure artificial muscle 6a to perform the opposite movement, thereby causing the rotational joint 3 to perform counter-clockwise rotation. Namely, the flow path from the pneumatic-pressure source 21 to the fluid injecting/ejecting member 15 of the tubular-shaped elastic member 12 of the pneumatic-pressure artificial muscle 6b is opened through the 5-port flow-rate controlling solenoid valve 23a, thereby supplying air to the pneumatic-pressure artificial muscle 6b at a flow rate proportional to the absolute value of the voltage command value. Further, on the pneumatic-pressure artificial muscle 6a-side, the flow path from the fluid injecting/ejecting member 15 of the tubular-shaped elastic member 12 of the pneumatic-pressure artificial muscle 6a to the atmospheric pressure is opened through the 5-port flow-rate controlling solenoid valve 23a, thereby discharging air flows from the pneumatic-pressure artificial muscle 6a to the atmosphere at a flow rate proportional to the absolute value of the voltage command value. Accordingly, the entire length of the pneumatic-pressure artificial muscle 6b is reduced (see FIG. 3B) while the entire length of the pneumatic-pressure artificial muscle 6a is increased (see FIG. 3A), which causes a counter-clockwise rotational motion of the rotational joint 3 at a velocity proportional to the absolute value of the voltage command value, in the direction opposite to the arrow.

The fluid injecting/ejecting members 19a, 19b, and 19c of the interval control actuator 9 are coupled to the 5-port flow-rate controlling solenoid valve 23b. The 5-port flow-rate controlling solenoid valve 23b is connected at its first port to the fluid injecting/ejecting member 19b and also is connected at its second port to the fluid injecting/ejecting members 19a and 19c at branches of the second port.

Figure 6A:
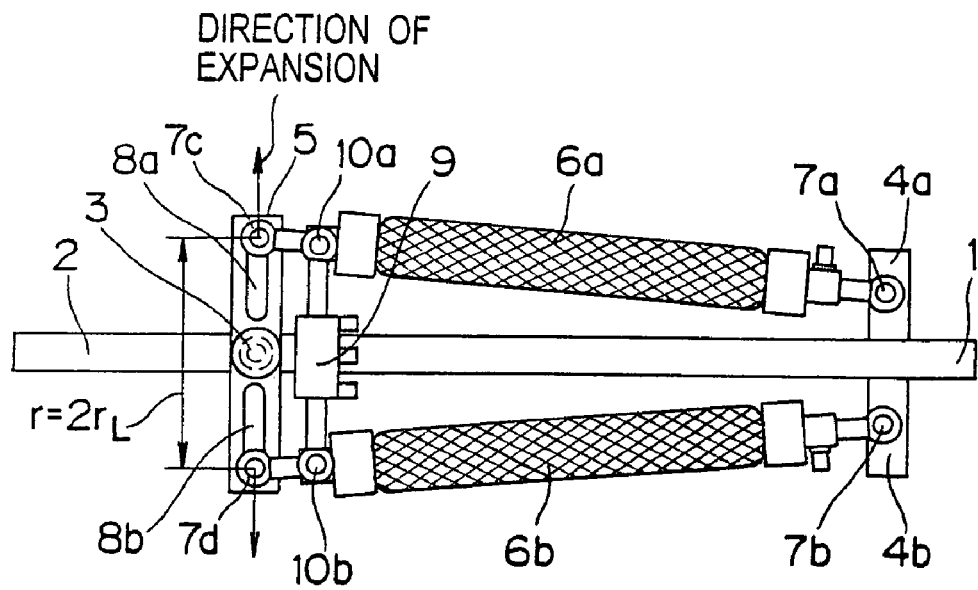
FIG. 6A is a view illustrating an operation of the interval control actuator in the joint driving device according to the first embodiment of the present invention.

If a positive voltage command value is input to the 5-port flow-rate controlling solenoid valve 23b from the control computer 24 through the D/A board 24a, this causes the 5-port flow-rate controlling solenoid valve 23b to be switched to a state designated by a pneumatic-pressure circuit symbol C in FIG. 5, which causes the flow path from the pneumatic-pressure source 21 to the fluid injecting/ejecting member 19b to be opened through the 5-port flow-rate controlling solenoid valve 23b, thereby supplying air to the cylinder chamber 20b at a flow rate proportional to the absolute value of the voltage command value. On the other hand, on the cylinder chambers 20a and 20c-sides, the flow paths from the fluid injecting/ejecting members 19a and 19c to the atmospheric pressure are opened through the 5-port flow-rate controlling solenoid valve 23b, thereby discharging air flows from the cylinder chambers 20a and 20c to the atmosphere at a flow rate proportional to the absolute value of the voltage command value. Accordingly, as illustrated in FIG. 6A, the interval r between the rotation joints 11a and 11b of the interval control actuator 9 is increased, thereby performing a motion for increasing the interval r between the elastic body actuators 6a and 6b at a velocity proportional to the absolute value of the voltage command value, as designated by an arrow.

Figure 6B:
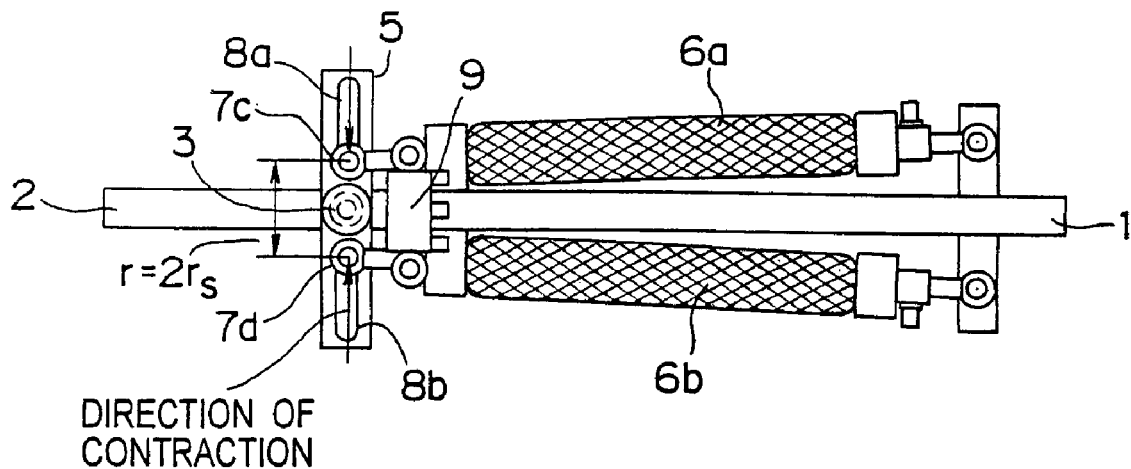
FIG. 6B is a view illustrating an operation of the interval control actuator in the joint driving device according to the first embodiment of the present invention.

On the other hand, if a negative voltage command value is input to the 5-port flow-rate controlling solenoid valve 23b from the control computer 24 through the D/A board 24a, this causes the 5-port flow-rate controlling solenoid valve 23b to be switched to a state designated by a pneumatic-pressure circuit symbol D, which causes the interval control actuator 9 to perform the opposite movement. Namely, the flow paths from the pneumatic-pressure source 21 to the fluid injecting/ejecting members 19a and 19c of the interval control actuator 9 are opened through the 5-port flow-rate controlling solenoid valve 23b, thereby supplying air to the cylinder chambers 20a and 20c at a flow rate proportional to the absolute value of the voltage command value. On the other hand, on the cylinder chamber 20b-side, the flow path from the fluid injecting/ejecting member 19b to the atmospheric pressure is opened through the 5-port flow-rate controlling solenoid valve 23b, thereby discharging air flows from the cylinder chamber 20b to the atmosphere at a flow rate proportional to the absolute value of the voltage command value. Accordingly, as illustrated in FIG. 6B, the interval r between the rotation joints 11a and 11b of the interval control actuator 9 is reduced, thereby performing a motion for reducing the interval r between the elastic body actuators 6a and 6b at a velocity proportional to the absolute value of the voltage command value, as designated by an arrow.

There will be described operations of the joint driving device having the aforementioned configuration.

Figure 2B:
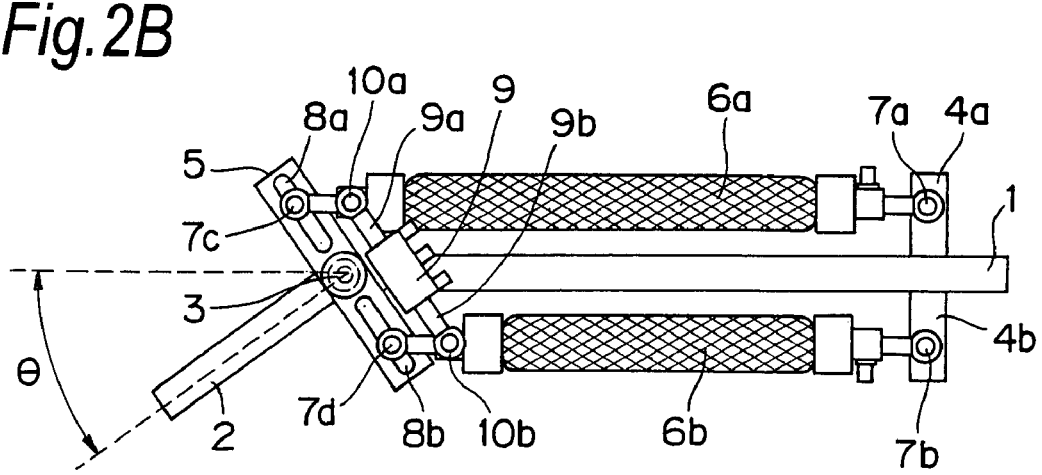
FIG. 2B is a view illustrating an operation of the joint driving device according to the first embodiment of the present invention.

As previously described, the pair of elastic body actuators 6a and 6b are coupled to the actuator driving-force transfer member 5 through the rotation joints 7c and 7d such that the pair of elastic body actuators 6a and 6b sandwich the first configuration member 1 and face each other. Accordingly, if the upper elastic body actuator 6a in FIG. 1 is contracted while the other lower elastic body actuator 6b in FIG. 1 is expanded, this causes a rotational motion of the rotational joint 3 in the clockwise direction about its rotation shaft. On the contrary, if the upper elastic body actuator 6a in FIG. 1 is expanded while the other lower elastic body actuator 6b in FIG. 1 is contracted, this causes a rotational motion in the reverse direction, namely in the counter-clockwise direction, as illustrated in FIG. 2B.

As described above, since the elastic body actuators 6 cause normal and reverse rotational motions of the first configuration member 1 and the actuator driving-force transfer member 5 to cause swinging motions of the first configuration member 1 and the second configuration member 2, namely motions thereof by an angle θ.

In this case, the first embodiment of the present invention is characterized in that the interval control actuator 9 is placed to enable controlling the interval r between the coupling points between the elastic body actuators 6a and 6b and the actuator driving-force transfer member 5 (more specifically, the interval r between the rotation axes of the rotation joints 7c and 7d of the elastic body actuators 6a and 6b coupled to the actuator driving-force transfer member 5).

For example, assuming that the contractive force of the elastic body actuator 6a is $F_a$ and the contractive force of the elastic body actuator 6b is $F_b$ in the case where the interval r between the coupling points is increased as in FIG. 6A (in the case where the interval r becomes $2r_L$) and in the case where the interval r between the coupling points is reduced as in FIG. 6B (in the case where the interval r becomes $2r_s$), the driving torque $\tau_L$ becomes $\tau_L=(F_a-F_b)r_L$ in the case of FIG. 6A while the driving torque $\tau_s$ becomes $\tau_s=(F_a-F_b)r_s$ in the case of FIG. 6B and, therefore, $\tau_L$ is greater than $\tau_s$ since $r_L$ is greater than $r_s$. Namely, a greater torque can be generated with the same contractive forces, in the case of FIG. 6A. As described above, since the interval control actuator 9 is placed to enable controlling the interval r between the coupling points between the elastic body actuators 6a and 6b and the actuator driving-force transfer member 5, it is possible to make the driving torque variable with respect to the same contractive forces.

Figure 19A:
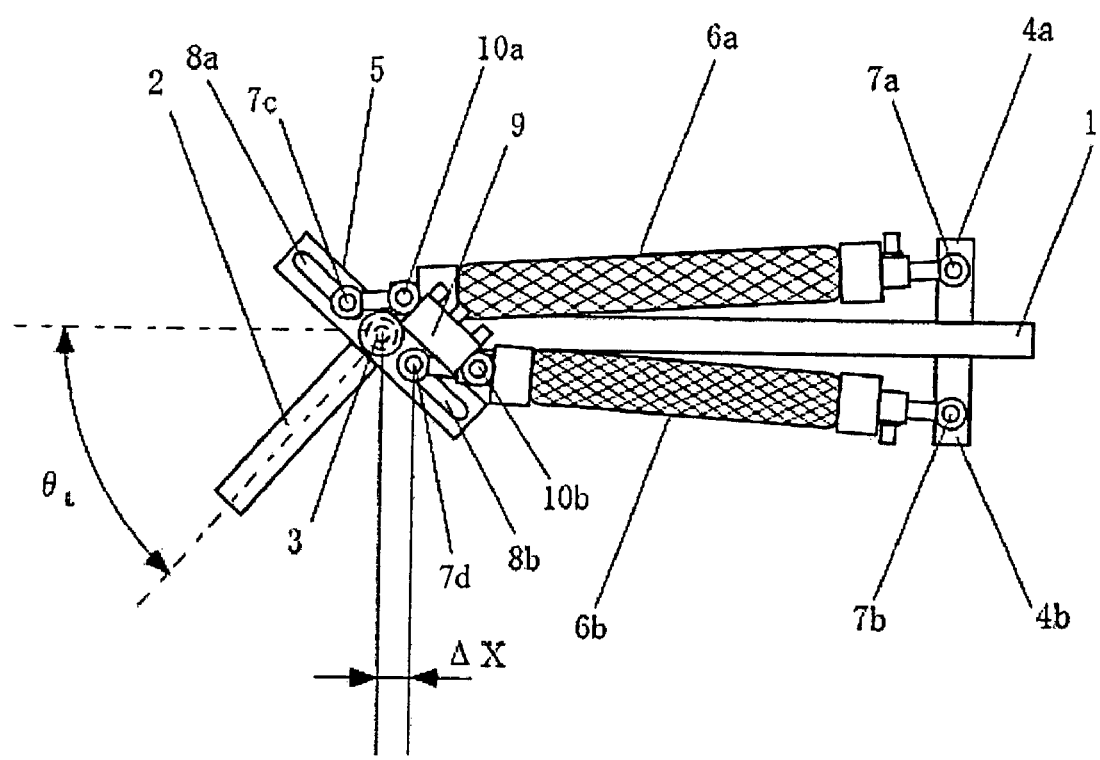
FIG. 19A is an explanation view of the joint driving device according to the first embodiment of the present invention at a state where $\theta_L$ is smaller than $\theta_S$.
Figure 19B:
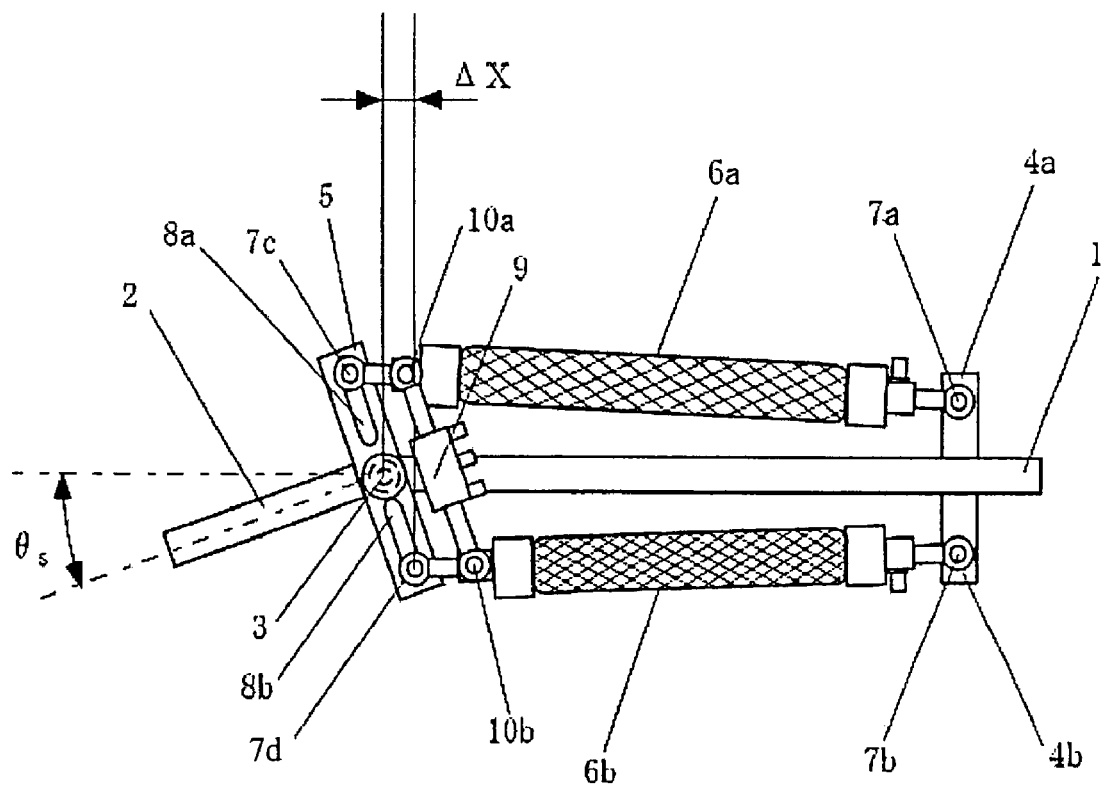
FIG. 19B is an explanation view of the joint driving device according to the first embodiment of the present invention at a state where $\theta_L$ is smaller than $\theta_S$.

On the other hand, in consideration of the amount of rotational displacement, assuming that the amount of displacement of the elastic body actuator 6a or 6b is Δx, the rotational displacement Δθ of the swing angle θ of the second configuration member 2 can be considered as follows. That is, the swing angle $\theta_L$ can be approximated to $\theta_L = \arcsin(\Delta x/r_L)$ in the case of FIG. 6A while the swing angle $\theta_s$ can be approximated to $\theta_s = \arcsin(\Delta x/r_s)$ in the case of FIG. 6B, and, therefore, $\theta_L$ is greater than $\theta_s$ since $r_L$ is greater than $r_s$ (see FIGS. 19A and 19B). Namely, in the case of FIG. 6B, a greater rotational displacement Δθ can be generated with the same amount of displacement Δx of the elastic body actuator 6a or 6b, thereby generating a greater maximum displacement of the swing angle θ.

As described above, according to the first embodiment of the present invention, by placing the interval control actuator 9 and controlling the operation of the interval control actuator 9 with the control device 24, it is possible to continuously and flexibly switch between the operation which prioritizes the rotational torque and the operation which prioritizes the rotational displacement, depending on the situation.

Figure 20:
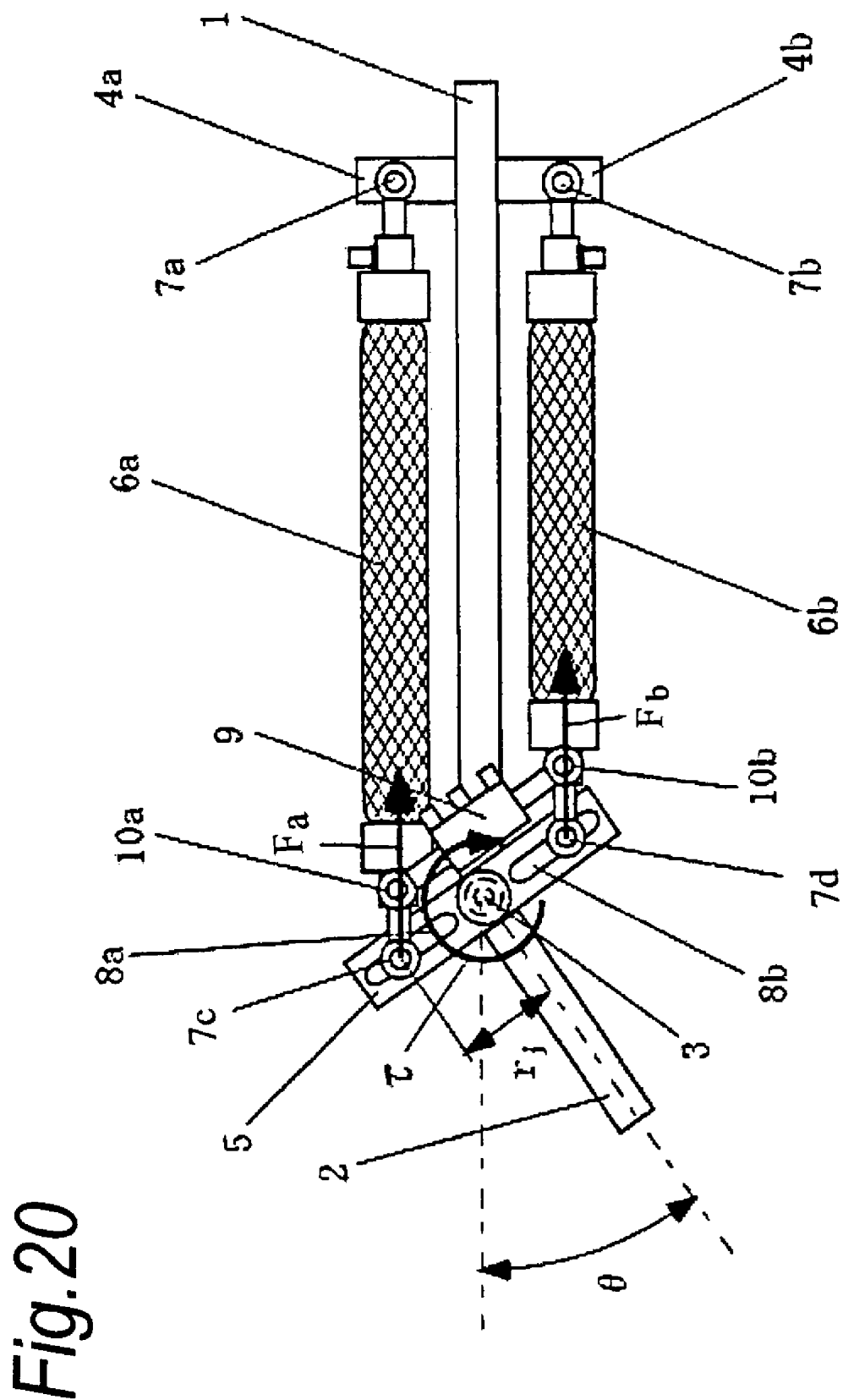
FIG. 20 is an explanation view of the joint driving device according to the first embodiment of the present invention in the case where the rotational torque is constant.

Further, assuming that the distance between the rotation axis of the rotational joint 3 and the rotation axis of the rotation joint 7c is $r_j$, the swing angle of the rotational joint 3 is θ, the contractive force of the elastic body actuator 6a is $F_a$ and the contractive force of the elastic body actuator 6b is $F_b$, the generated rotational torque τ can be approximated to $\tau = (F_a - F_b) r_j \cos\theta$ and, therefore, the following equation holds; $r_j = \tau_c / \cos\theta$. In this case, by controlling the interval control actuator 9 such that $\tau_c$ is a constant value, the rotational torque τ becomes $\tau = \tau_c (F_a - F_b)$ and, therefore, the rotational torque τ in correspondence with the same contractive forces of the elastic body actuators can be controlled to be substantially constant, regardless of the swing angle θ (see FIG. 20).

Figure 21:
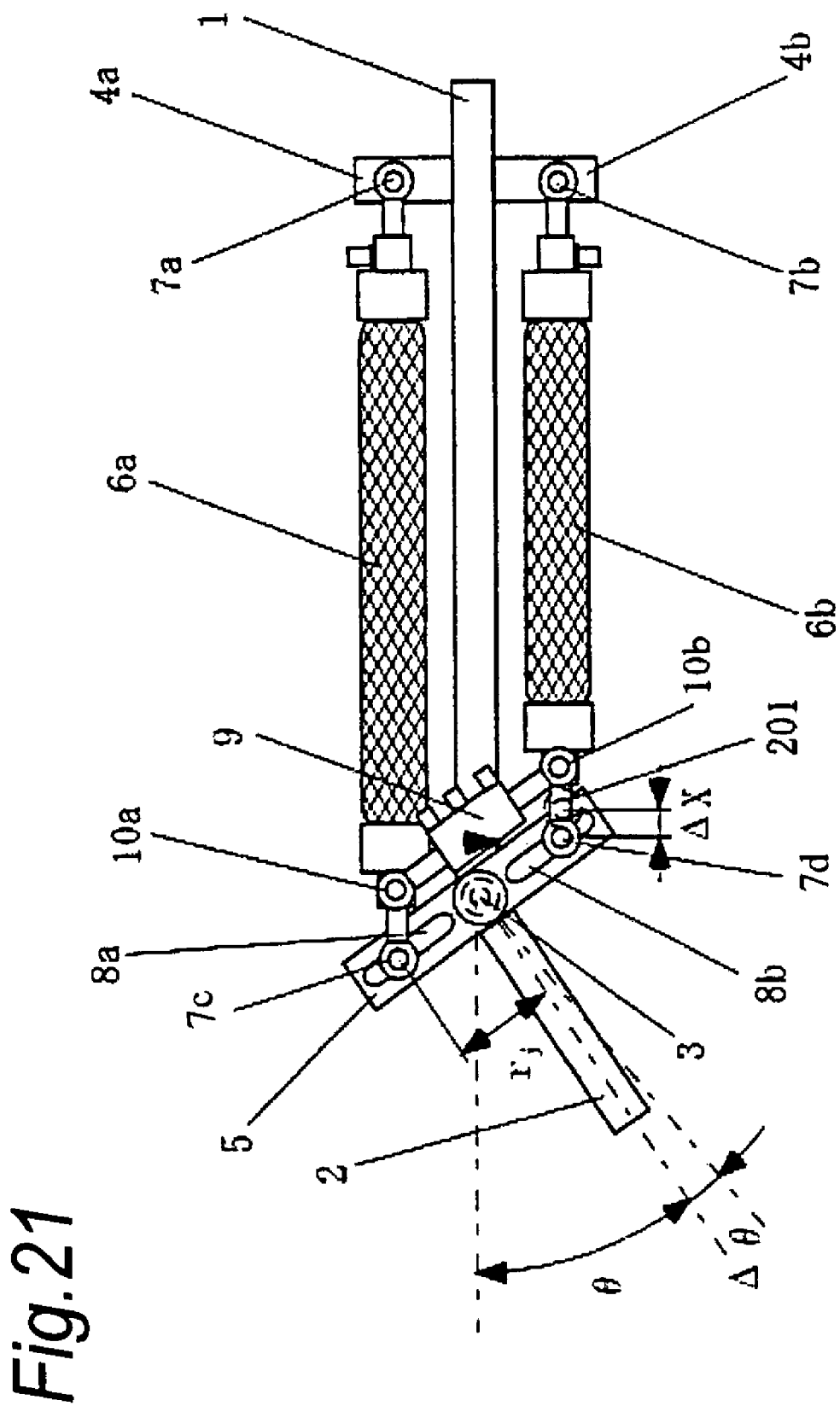
FIG. 21 is an explanation view of the joint driving device according to the first embodiment of the present invention in the case where the rotational displacement is constant.

Further, there will be studied a case of further causing a rotation by Δθ from the state where the swing angle is θ as illustrated in FIG. 21, assuming that the distance between the rotation axis of the rotational joint 3 and the rotation axis of the rotation joint 7c is $r_j$ and the swing angle of the rotational joint 3 is θ. Assuming that the displacement of the elastic body actuators 6 required for further causing a rotation by Δθ is Δx (a dotted line 201 in FIG. 21 designates the rotation joint 7c after the displacement by Δx), the rotational displacement Δθ of the swing angle θ can be approximated to $\Delta\theta = \Delta x \cos\theta / r_j$ and, therefore, the following equation holds; $r_j = \cos\theta / \Delta\theta_c$. In this case, by controlling the interval control actuator 9 such that $\Delta\theta_c$ is a constant value, the rotational displacement Δθ becomes $\Delta\theta = \Delta x \Delta\theta_c$ and, therefore, the rotational displacement Δθ in correspondence with the same displacement Δx of the elastic body actuators can be controlled to be substantially constant, regardless of the swing angle θ (see FIG. 21).

Figure 7:
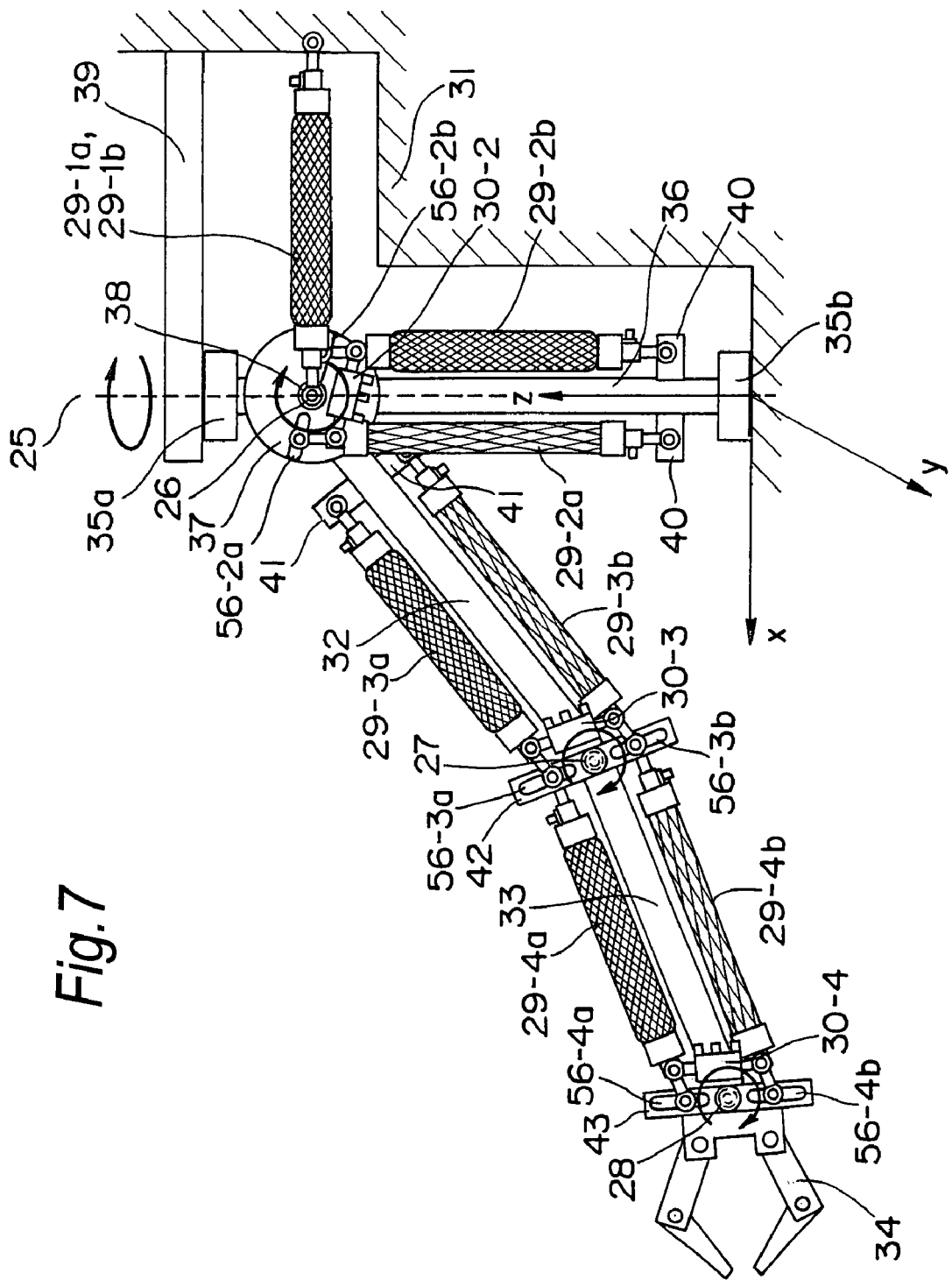
FIG. 7 is a view illustrating the configuration of a robot arm to which a joint driving device according to the first embodiment of the present invention is applied.

Next, FIG. 7 illustrates a case where the present joint driving device is applied to a robot arm. The robot arm illustrated in FIG. 7 is a four-degree-of-freedom arm having a first joint 25, a second joint 26, a third joint 27, and a fourth joint 28, wherein the portions of the second joint 26, the third joint 27, and the fourth joint 28 are constituted by the joint driving devices according to the first embodiment of the present invention.

More specifically, the first joint shaft 25 is driven to rotate in the normal and reverse directions through antagonistic driving with an elastic body actuator 29-1a and an elastic body actuator 29-1b, the second joint shaft 26 is driven to rotate in the normal and reverse directions through antagonistic driving with an elastic body actuator 29-2a and an elastic body actuator 29-2b, the third joint shaft 27 is driven to rotate in the normal and reverse directions through antagonistic driving with an elastic body actuator 29-3a and an elastic body actuator 29-3b, and the fourth joint shaft 28 is driven to rotate in the normal and reverse directions through antagonistic driving with an elastic body actuator 29-4a and an elastic body actuator 29-4b.

Further, an interval control actuator 30-2 increases and reduces the distance between the supporting points of the antagonistic driving with the elastic body actuator 29-2a and the elastic body actuator 29-2b (which corresponds to the interval r between the rotation axes of the rotation joints 7c and 7d of the elastic body actuators 6a and 6b (the elastic body actuator 29-2a and the elastic body actuator 29-2b, in this case) coupled to the aforementioned actuator driving-force transfer member 5). Further, an interval control actuator 30-3 increases and reduces the distance between the supporting points of the antagonistic driving with the elastic body actuator 29-3a and the elastic body actuator 29-3b (which corresponds to the interval r between the rotation axes of the rotation joints 7c and 7d of the elastic body actuators 6a and 6b (the elastic body actuator 29-3a and the elastic body actuator 29-3b, in this case) coupled to the aforementioned actuator driving-force transfer member 5). Further, an interval control actuator 30-4 increases and reduces the distance between the supporting points of the antagonistic driving with the elastic body actuator 29-4a and the elastic body actuator 29-4b (which corresponds to the interval r between the rotation axes of the rotation joints 7c and 7d of the elastic body actuators 6a and 6b (the elastic body actuator 29-4a and the elastic body actuator 29-4b, in this case) coupled to the aforementioned actuator driving-force transfer member 5).

More specifically, the aforementioned robot arm is constituted by the first joint shaft 25 which rotates in the normal and reverse directions within a lateral plane along the vertical axis with respect to a fixed wall 31, the second joint shaft 26 which rotates in the normal and reverse directions within a vertical plane, the third joint shaft 27 which rotates in the normal and reverse directions within a vertical plane between a first arm 32 and a second arm 33, and the fourth joint shaft 28 which rotates in the normal and reverse directions within a vertical plane between the second arm 33 and a hand 34.

The first joint shaft 25 includes a rotation shaft 36 which is rotatably supported at its upper and lower end portions by bearings 35a and 35b along the vertical direction and a circular-shaped supporting member 37 which is rotatably coupled to the rotation shaft 36, wherein the elastic body actuators 29-1a and the elastic body actuator 29-1b are coupled, at their respective one end portions, to the fixed wall 31 and also are coupled, at their respective other end portions, to the supporting shaft 38 of the circular-shaped supporting member 37. Accordingly, the first arm 32, the second arm 33, and the hand 34 of the robot arm can be integrally rotated in the normal and reverse directions within a lateral plane about the vertical axis Z of the first joint shaft 25, through the antagonistic driving with the elastic body actuators 29-1a and the elastic body actuator 29-1b. Further, the upper bearing 35a is supported by the fixed wall 31 through a supporting rod 39.

The second joint shaft 26 includes the elastic body actuators 29-2a and 29-2b which are coupled between the circular-shaped supporting member 37 (corresponding to the actuator driving-force transfer member 5 for the pair of elastic body actuators) secured to the rotation shaft 36 (corresponding to the first configuration member 1 for the aforementioned pair of elastic body actuators) with respect to the rotary direction of the rotation shaft 36 for preventing relative rotation and a supporting member 40 (corresponding to the actuator supporting members 4a and 4b for the pair of elastic body actuators) secured to the rotation shaft 36 near the fixed wall 31 such that it is orthogonal to the longitudinal direction of the rotation shaft 36, so that the first arm 32, the second arm 33, and the hand 34 of the robot arm can be integrally rotated in the normal and reverse directions within a vertical plane about the lateral axis of the supporting shaft of the second joint shaft 26 through the antagonistic driving with the elastic body actuators 29-2a and 29-2b. Further, the circular-shaped supporting member 37 is provided with long groove holes 56-2a and 56-2b (corresponding to the long groove holes 8a and 8b of the actuator driving-force transfer member 5 for the pair of elastic body actuators) extending radially from the second joint shaft 26, which enables moving the coupling points between the elastic body actuators 29-2a and 29-2b and the circular-shaped supporting member 37 along the long groove holes 56-2a and 56-2b with the interval control actuator 30-2, thereby increasing and reducing the distance between the supporting points of the antagonistic driving.

The third joint shaft 27 includes a supporting member 41 (corresponding to the actuator supporting members 4a and 4b for the pair of elastic body actuators) which is secured, on the circular-shaped supporting member 37 side, to the first arm 32 (corresponding to the first configuration member 1 between the aforementioned pair of elastic body actuators), which is secured at its one end to the circular-shaped supporting member 37, such that the supporting member 41 is orthogonal to the longitudinal direction of the first arm 32 and a supporting member 42 (corresponding to the actuator driving-force transfer member 5 for the pair of elastic body actuators) which is secured to one end of the second arm 33 such that the supporting member 42 is orthogonal to the longitudinal direction of the second arm 33, and which is rotatably coupled to the tip end of the first arm 32. The elastic body actuators 29-3a and 29-3b are coupled between the supporting member 41 of the first arm 32 and the supporting member 42 secured to the one end of the second arm 33, so that the first arm 32 and the second arm 33 of the robot arm can be relatively rotated in the normal and reverse directions with respect to each other, within a vertical plane about the lateral axis of the supporting shaft of the third joint shaft 27 through the antagonistic driving with the elastic body actuators 29-3a and 29-3b. Further, the supporting member 42 is provided with long groove holes 56-3a and 56-3b (corresponding to the long groove holes 8a and 8b of the actuator driving-force transfer member 5 for the pair of elastic body actuators) extending radially from the third joint shaft 27, which enables moving the coupling points between the elastic body actuators 29-3a and 29-3b and the supporting member 42 with the interval control actuator 30-3 along the long groove holes 56-3a and 56-3b, thereby increasing and reducing the distance between the supporting points of the antagonistic driving.

The fourth joint shaft 28 includes the elastic body actuators 29-4a and 29-4b which are coupled between the supporting member 42 (corresponding to the actuator supporting members 4a and 4b for the pair of elastic body actuators) of the second arm 33 (corresponding to the first configuration member 1 for the aforementioned pair of elastic body actuators) and a supporting member 43 (corresponding to the actuator driving-force transfer member 5 for the pair of elastic body actuators) secured to one end of the hand 34 and rotatably coupled to the second arm 33, so that the hand 34 can be rotated in the normal and reverse directions with respect to the second arm 33 within a vertical plane about the lateral axis of the supporting shaft of the fourth joint shaft 28, through the antagonistic driving with the elastic body actuators 29-4a and 29-4b. Further, the supporting member 43 is provided with long groove holes 56-4a and 56-4b (corresponding to the long groove holes 8a and 8b of the actuator driving-force transfer member 5 for the pair of elastic body actuators) extending radially from the fourth joint shaft 28, which enables moving the coupling points between the elastic body actuators 29-4a and 29-4b and the supporting member 43 with the interval control actuator 30-4 along the long groove holes 56-4a and 56-4b, thereby increasing and reducing the distance between the supporting points of the antagonistic driving.

Figure 8:
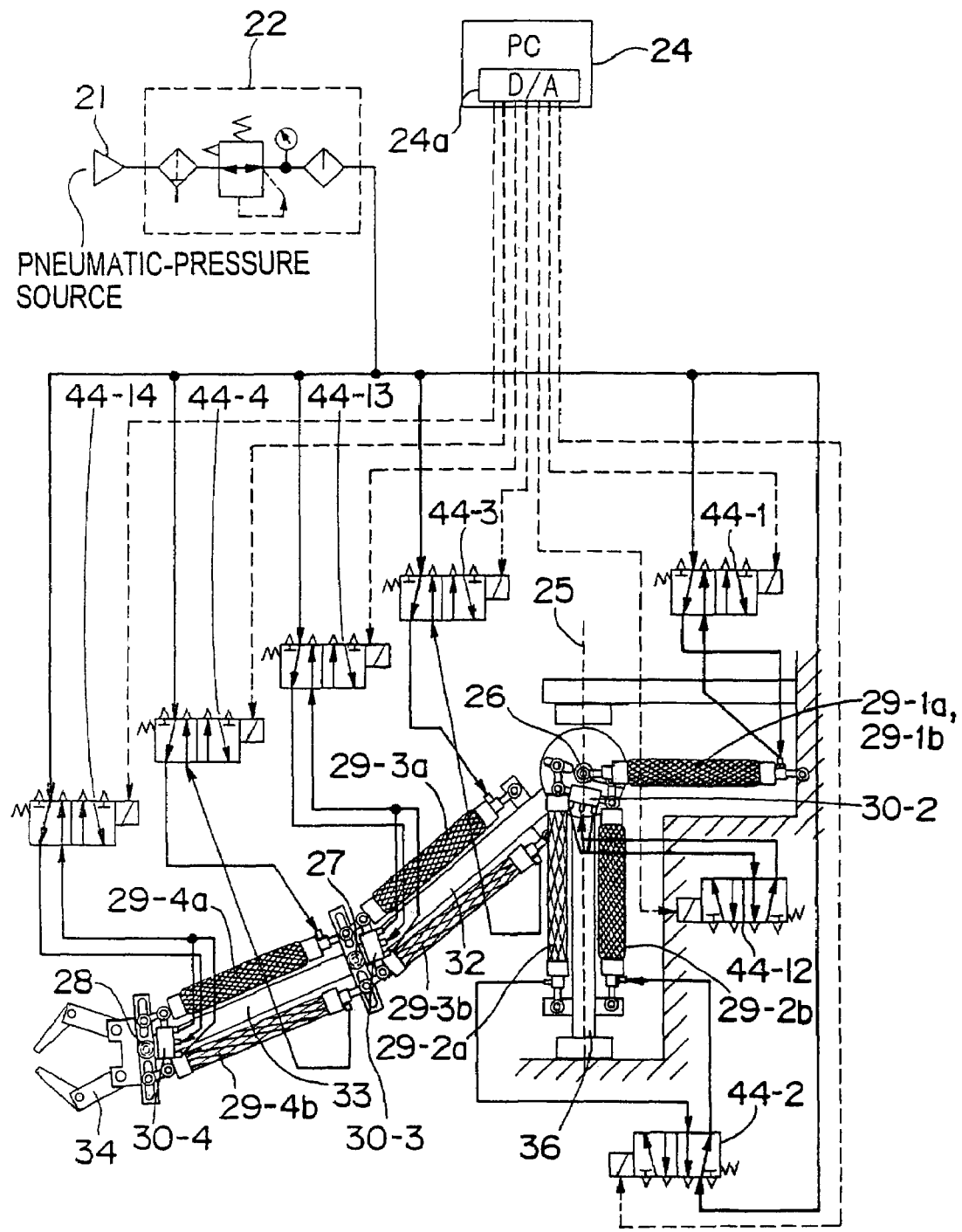
FIG. 8 is a view illustrating the configuration of a pneumatic-pressure supply driving system for driving the robot arm to which the joint driving device according to the first embodiment of the present invention is applied.

FIG. 8 is a view illustrating the structure of a pneumatic-pressure supply system for driving the robot arm illustrated in FIG. 7. In the pneumatic-pressure supply system illustrated in FIG. 8, seven 5-port flow-rate controlling solenoid valves 44-1, 44-2, 44-3, 44-4, 44-12, 44-13, and 44-14 are placed. The other structures and the operation principle are similar to those of FIG. 5 and, therefore, detailed description thereof will be omitted.

The 5-port flow-rate controlling solenoid valve 44-1 supplies pneumatic-pressures to the elastic body actuators 29-1a and 29-1b to drive rotations in the normal and reverse directions about the first joint shaft 25. The 5-port flow-rate controlling solenoid valve 44-2 supplies pneumatic-pressures to the elastic body actuators 29-2a and 29-2b to drive rotations in the normal and reverse directions about the second joint shaft 26. The 5-port flow-rate controlling solenoid valve 44-3 supplies pneumatic-pressures to the elastic body actuators 29-3a and 29-3b to drive rotations in the normal and reverse directions about the third joint shaft 27. The 5-port flow-rate controlling solenoid valve 44-4 supplies pneumatic-pressures to the elastic body actuators 29-4a and 29-4b to drive rotations in the normal and reverse directions about the fourth joint shaft 28.

The 5-port flow-rate controlling solenoid valve 44-12 supplies a pneumatic-pressure to the interval control actuator 30-2 to increase and reduce the distance between the coupling points between the elastic body actuators 29-2a and 29-2b and the circular-shaped supporting member 37. The 5-port flow-rate controlling solenoid valve 44-13 supplies a pneumatic-pressure to the interval control actuator 30-3 to increase and reduce the distance between the coupling points between the elastic body actuators 29-3a and 29-3b and the supporting member 42. The 5-port flow-rate controlling solenoid valve 44-14 supplies a pneumatic-pressure to the interval control actuator 30-4 to increase and reduce the distance between the coupling points between the elastic body actuators 29-4a and 29-4b and the supporting member 43.

With the aforementioned configuration, it is possible to realize basic functions of the robot arm 10, such as griping and carrying of an object, utilizing the multiple degrees of freedom. Further, the driving forces of the elastic body actuators 29-1a to 29-4b are transferred to the rigid coupling with the rotation joints, which can eliminate concerns about looseness, fall and the like, thereby providing a mechanism with higher reliability, in comparison with driving using wires and pulleys. Further, it is possible to increase and reduce the distances between the coupling points between the elastic body actuators 29-2a and 29-2b, 29-3a, and 29-3b, and 29-4a and 29-4b and the supporting members 37, 42, and 43 through the interval control actuators 30-2, 30-3, and 30-4, which enables generating greater torques by increasing the intervals therebetween for griping and carrying an object with a greater weight. On the other hand, by reducing the intervals therebetween, it is possible to increase the range in which the joints can be moved, thereby increasing the operable range of the robot arm.

As described above, with the joint driving device according to the present invention, it is possible to change the interval r between the position at which the aforementioned first elastic body actuator 6a is secured to the aforementioned second configuration member 2 and the position at which the aforementioned first elastic body actuator 6b is secured to the aforementioned second configuration member 2 through the driving control of the interval control actuator, which enables flexibly changing the characteristics such as generating higher outputs or increasing the operable range depending on the situation and also enables realizing a robot arm with higher reliability.

Second Embodiment

Figure 9A:
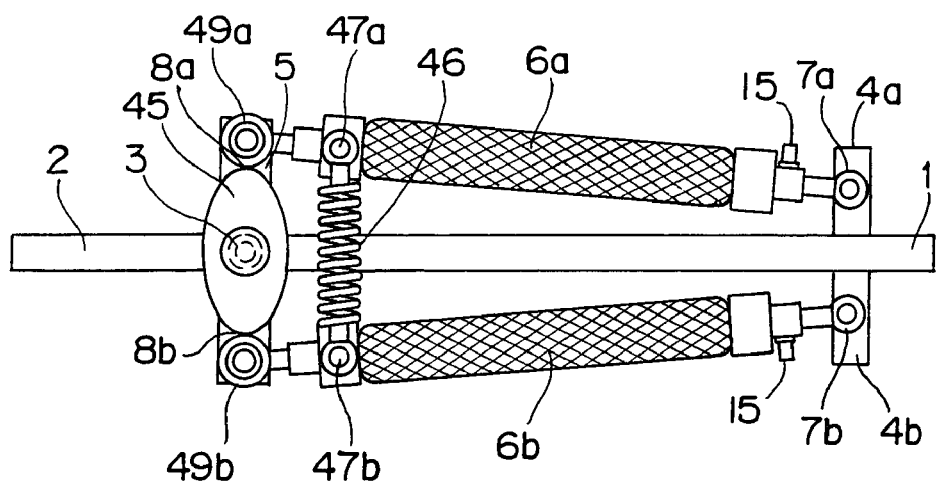
FIG. 9A is a view illustrating a configuration and an operation of a joint driving device according to a second embodiment of the present invention.
Figure 9B:
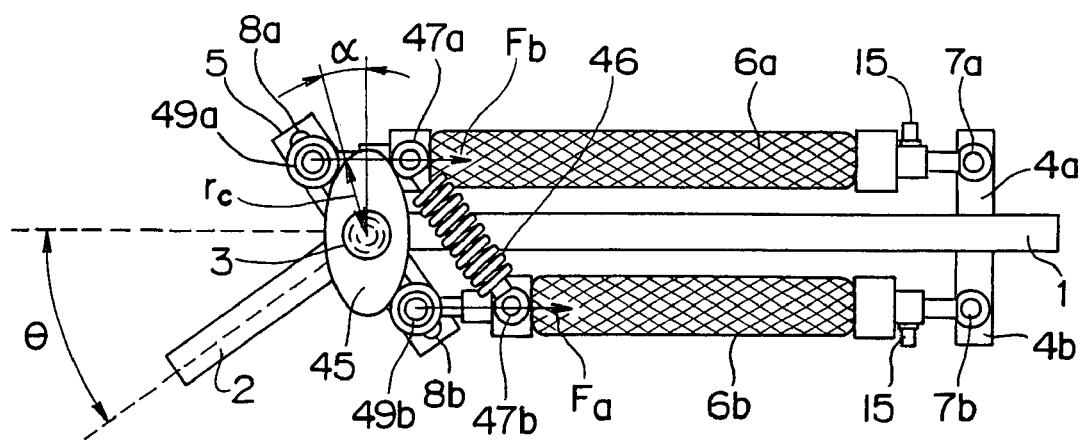
FIG. 9B is a view illustrating the configuration and the operation of the joint driving device according to the second embodiment of the present invention.

FIGS. 9A and 9B are views illustrating the configuration of a joint driving device according to a second embodiment of the present invention. The joint driving device of FIGS. 9A and 9B is different from the first embodiment in components which will be described later, while the other portions are the same as those of the first embodiment. These common components will be designated by the same reference characters as those of the first embodiment and detailed description thereof will be omitted.

Figure 10:
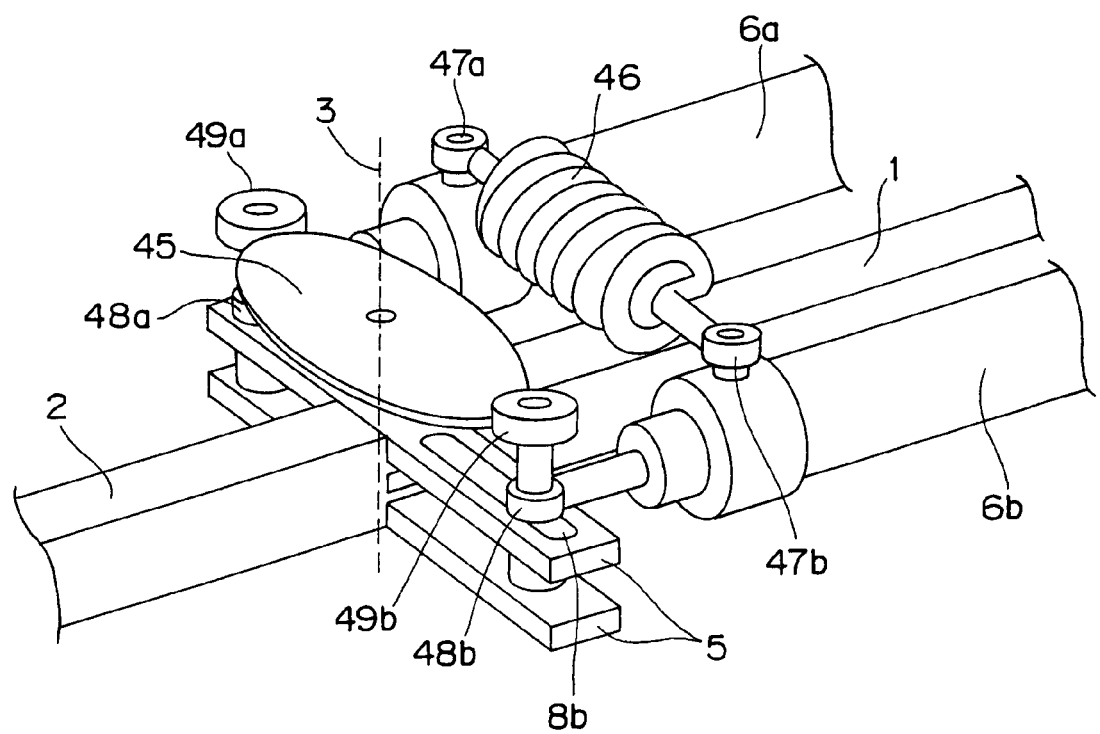
FIG. 10 is a partial perspective view illustrating the configuration of the joint driving device according to the second embodiment of the present invention.

In FIGS. 9A, 9B, and 10, a numeral 45 is an elliptical-plate shaped cam which is placed such that the center shaft thereof is coincident with the rotation shaft of a rotational joint 3 and the cam is not relatively rotatable with respect to a first configuration member 1. A numeral 46 is a spring which is coupled to the end portions of the elastic body actuators 6a and 6b near the rotational joint 3 through rotation joints 47a and 47b. Further, the end portions of the elastic body actuators 6a and 6b near the rotational joint 3 are coupled to long groove portions 8a and 8b in an actuator driving-force transfer member 5 through rotation joints 48a and 48b. Further, disk-roller shaped cam followers 49a and 49b are placed along the same axes as those of the rotation joints 48a and 48b, and the circumference side-surfaces of the cam followers 49a and 49b are kept in contact with the outer peripheral end surface of the cam 45 through the elastic force of the spring 46.

Accordingly, in the second embodiment, another exemplary securing-position variable mechanism is constituted by a securing-position moving cam mechanism including, for example, the elliptical-plate shaped cam 45, the cam followers 49a and 49b, the spring 46, the rotation joints 47a and 47b, and the like, and a securing-position guide mechanism including, for example, the rotation joints 48a and 48b, the long groove holes 8a and 8b and the like.

There will be described operations of the joint driving device having the aforementioned configuration. The operations and the like of the elastic body actuators are the same as those of the first embodiment and, therefore, description of the operations of the common components will be omitted.

First, as illustrated in FIG. 9A, at an initial state prior to expanding or contracting the elastic body actuators 6a and 6b, the cam followers 49a and 49b are kept in contact with the opposite end portions of the elliptical-plate shaped cam 45 along its longitudinal axis, so that the interval between the rotation axes of the cam followers 49a and 49b and, therefore, the interval r between the rotation axes of the rotation joints 48a and 48b for the elastic body actuators 6a and 6b coupled to the actuator driving-force transfer member 5 are made largest. Next, if the first configuration member 1 and the second configuration member 2 are driven to relatively swing with respect to each other about the rotational joint 3 through the expansion or contraction of the elastic body actuators 6a and 6b, this causes the cam followers 49a and 49b to rotate along the outer peripheral end surface of the cam 45 while being kept in contact with the outer peripheral end surface of the cam 45 without separating therefrom, with the effect of the spring 46. This increases or decreases the interval between the end portions of the elastic body actuators 6a and 6b coupled through the rotation joints 48a and 48b placed along the same axes as those of the cam followers 49a and 49b, depending on the shape of the outer peripheral end surface of the cam 45.

With the operation of the aforementioned cam 45, for example, assuming that the relationship $r_c = \tau_c/\cos \alpha$ holds with respect to the shape of the outer peripheral end surface of the cam 45, the rotational torque $\tau$ can be approximated to $\tau = (F_a - F_b) r_c \cos \theta$ which is generated when the swing angle of the rotational joint 3 is $\theta$, the contractive force of the elastic body actuator 6a is $F_a$ and the contractive force of the elastic body actuator 6b is $F_b$. Therefore, the relationship $\tau = \tau_c (F_a - F_b)$ holds, and the torque generated with the same contractive forces of the elastic body actuators can be controlled to be substantially constant, regardless of the swing angle $\theta$.

Further, for example, assuming that the relationship $r_c = \cos \alpha / \Delta \theta_c$ holds with respect to the shape of the outer peripheral end surface of the cam 45 and $\Delta \theta_c$ is a constant value, when the swing angle of the rotational joint 3 is $\theta$ and the displacement of the elastic body actuators 6 is $\Delta x$, the rotational displacement $\Delta \theta$ of the swing angle $\theta$ can be approximated to $\Delta \theta = \Delta x \cos \theta / r_c$. Therefore, the rotational displacement $\Delta \theta$ becomes $\Delta \theta = \Delta x \Delta \theta_c$, and the rotational displacement with respect to the same displacement of the elastic body actuators can be controlled to be substantially constant, regardless of the swing angle $\theta$.

As described above, in the second embodiment, the cam 45, the cam followers 49a and 49b, and the spring 46 are placed to realize a joint driving device capable of flexibly varying the characteristics such as generating greater torques or increasing the operable range depending on the situation, with a simple configuration, without utilizing additional actuators and the like for changing the interval between the end portions of the elastic body actuators 6a and 6b.

Third Embodiment

Figure 11:
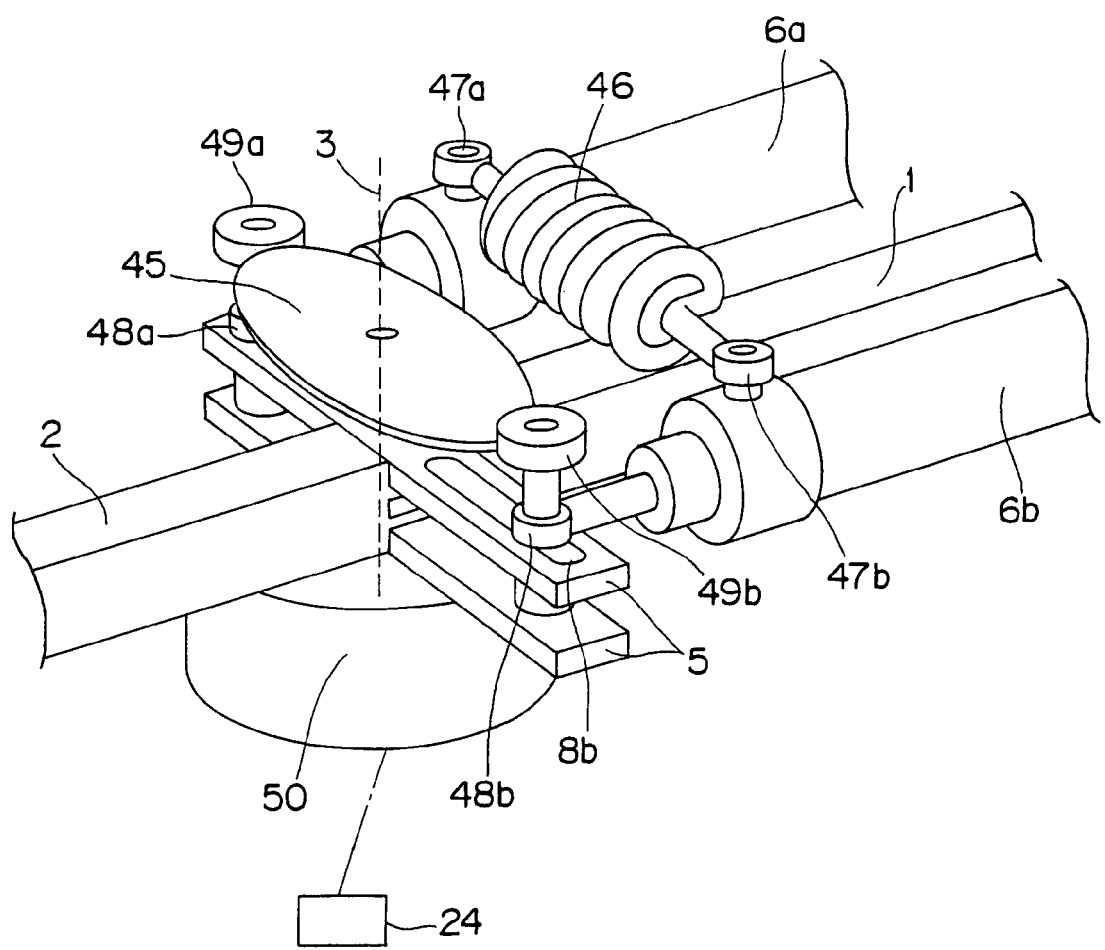
FIG. 11 is a partial perspective view illustrating a configuration of a joint driving device according to a third embodiment of the present invention.

FIG. 11 is a perspective view illustrating the configuration of a joint driving device according to a third embodiment of the present invention. In FIG. 11, a numeral 50 is a cam driving actuator which is operated under the control of the control computer 24 and is constituted by, for example, a rotational motor such as a DC servo motor, or a rotation type pneumatic actuator. The cam driving actuator 50 is secured to the actuator driving-force transfer member 5, and a cam 45 is secured to the output rotation shaft of the cam driving actuator 50. The rotational angle of the cam 45 relative to the actuator driving-force transfer member 5 can be controlled under the control of the control computer 24, through the cam driving actuator 50. The other configurations are similar to those of the aforementioned second embodiment and, therefore, the common components will be designated by the same reference characters and description thereof will be omitted.

In the joint driving device according to the third embodiment, when the rotation of the cam 45 is halted and the position of the cam 45 is held through the cam driving actuator 50, similarly to in the second embodiment, the cam followers 49a and 49b rotate along the outer peripheral end surface of the cam 45, thereby controlling the interval between the end portions of the elastic body actuators 6a and 6b.

Figure 12A:
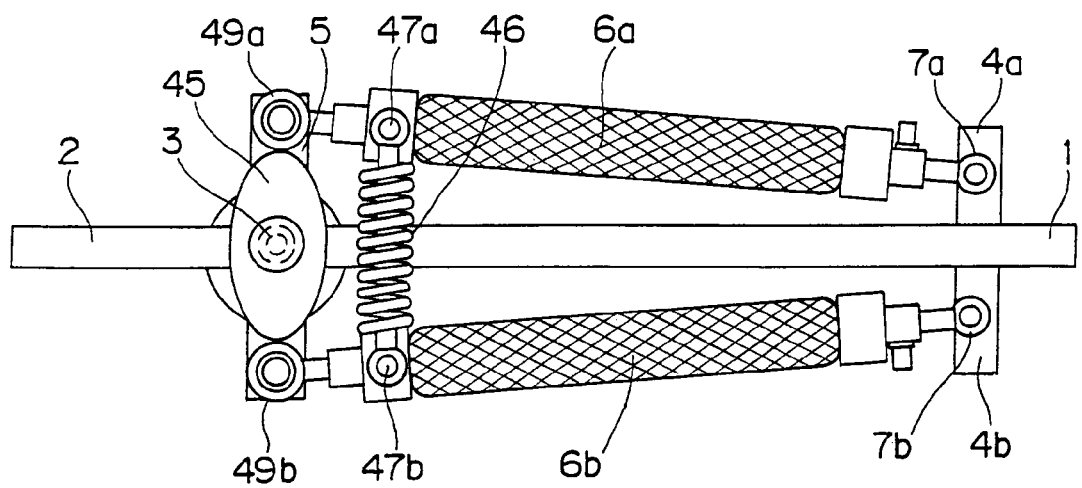
FIG. 12A is a view illustrating an operation of the joint driving device according to the third embodiment of the present invention.
Figure 12B:
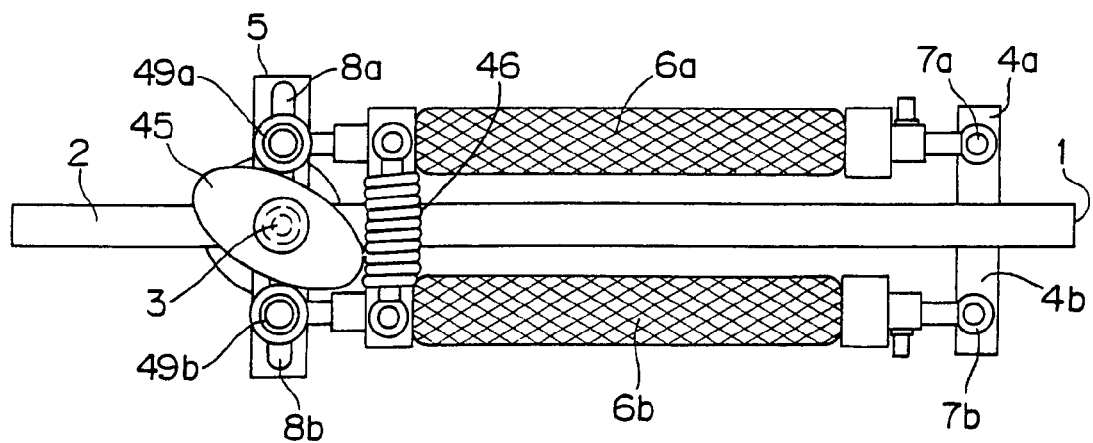
FIG. 12B is a view illustrating an operation of the joint driving device according to the third embodiment of the present invention.

Further, as illustrated in FIG. 12A and FIG. 12B, by causing a rotational motion of the cam 45 with respect to the actuator driving-force transfer member 5 through the cam driving actuator 50, it is possible to actively control the interval r between the end portions of the elastic body actuators 6a and 6b. Accordingly, in the case where the joint driving device is applied to a robot or the like, it is possible to further flexibly cope with various situations such as situations which require a greater force for holding an object with a greater weight, situation which require a greater operable range for operating the robot over a wider range or the like.

Further, according to the third embodiment, another exemplary securing-position variable mechanism is constituted by a securing-position moving cam mechanism including, for example, the cam driving actuator 50, the elliptical-plate shaped cam 45, the cam followers 49a and 49b, the spring 46, the rotation joints 47a and 47b, and the like, and a securing-position guide mechanism including, for example, the rotation joints 48a and 48b, the long groove holes 8a and 8b, and the like.

Fourth Embodiment

Figure 13A:
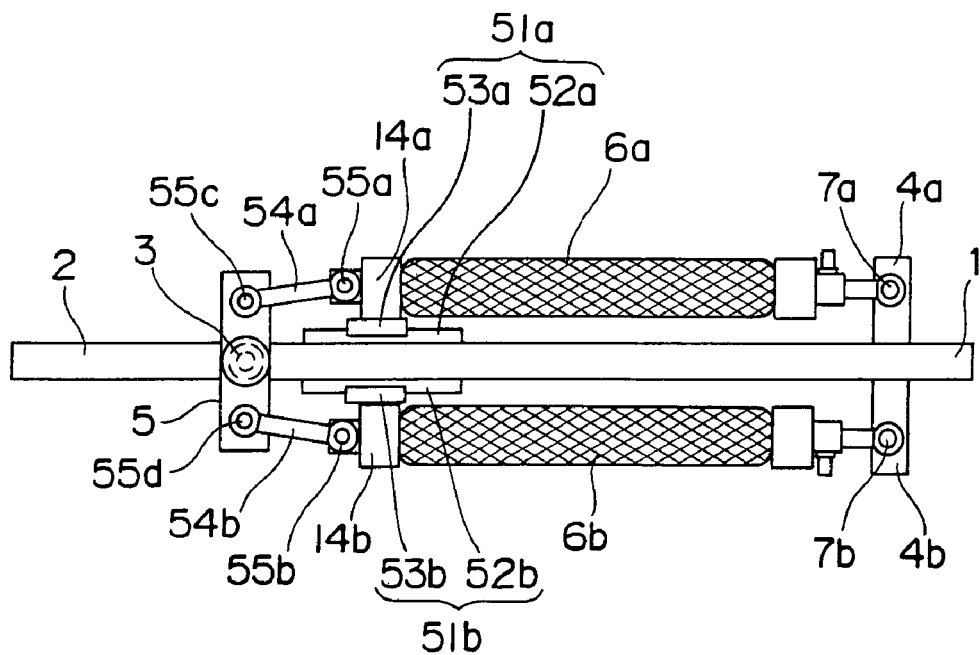
FIG. 13A is a view illustrating a configuration and an operation of a joint driving device according to a fourth embodiment of the present invention.
Figure 13B:
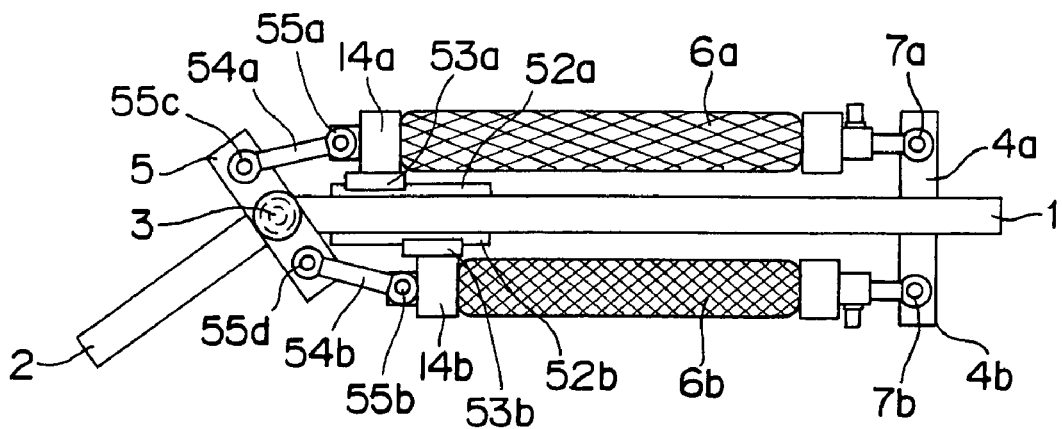
FIG. 13B is a view illustrating the configuration and the operation of the joint driving device according to the fourth embodiment of the present invention.
Figure 16:
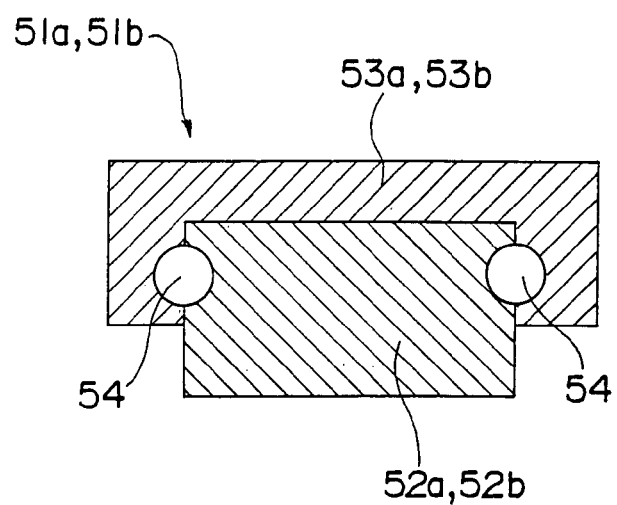
FIG. 16 is a cross-sectional view of linear guides in the joint driving device according to the fourth embodiment of the present invention.
Figure 17A:
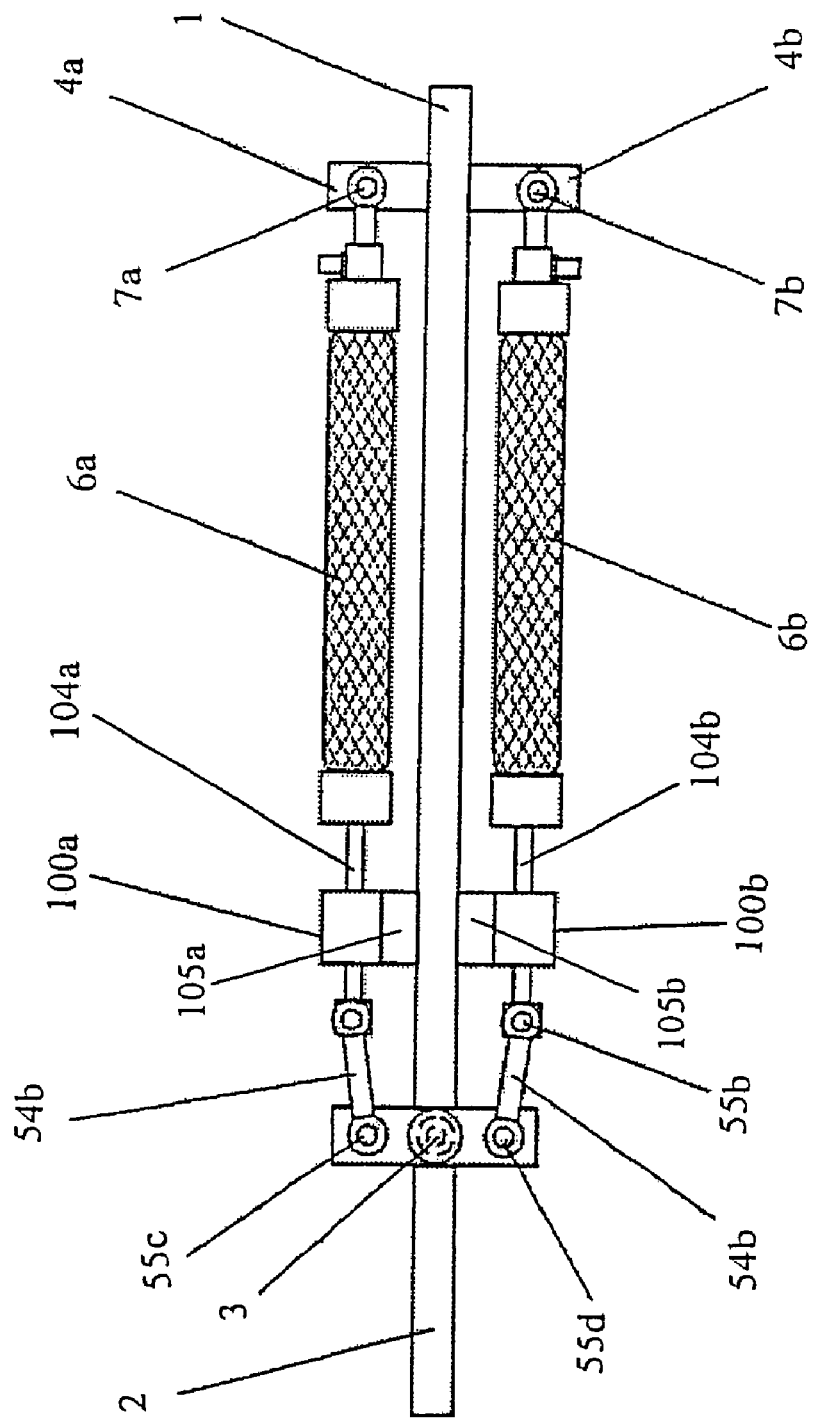
FIG. 17A is a view illustrating a configuration and an operation of a joint driving device according to a modified example of the fourth embodiment of the present invention.
Figure 17B:
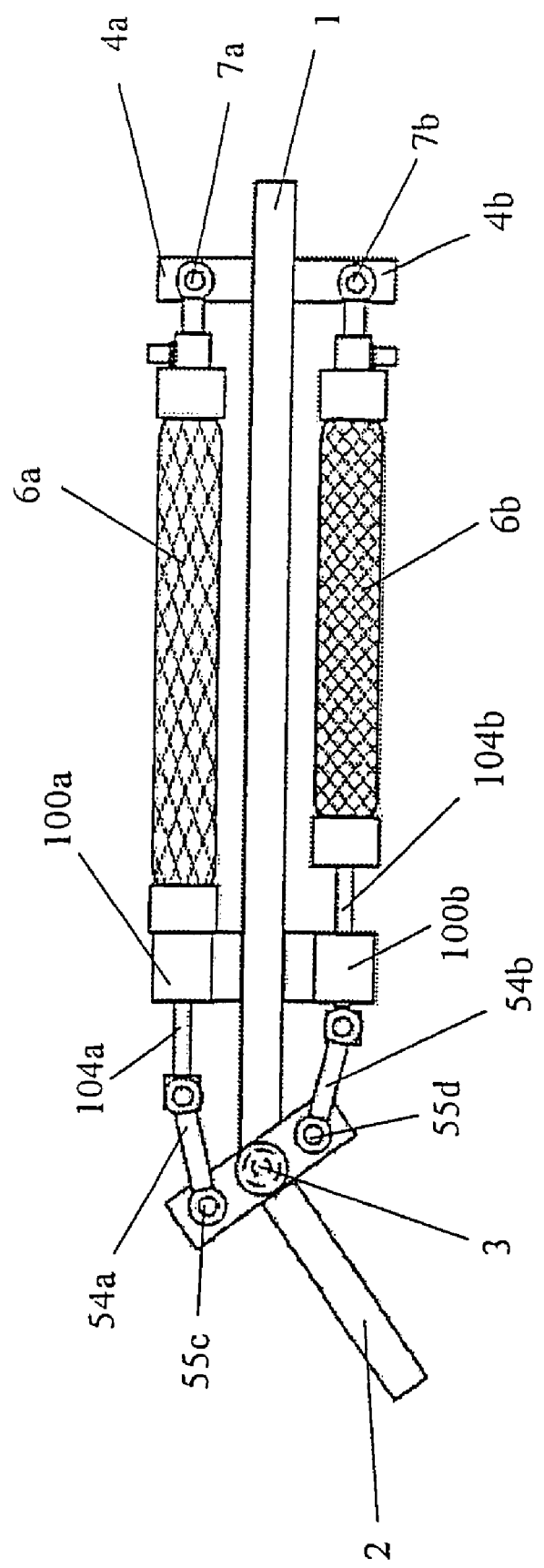
FIG. 17B is a view illustrating the configuration and the operation of the joint driving device according to a modified example of the fourth embodiment of the present invention.
Figure 18A:
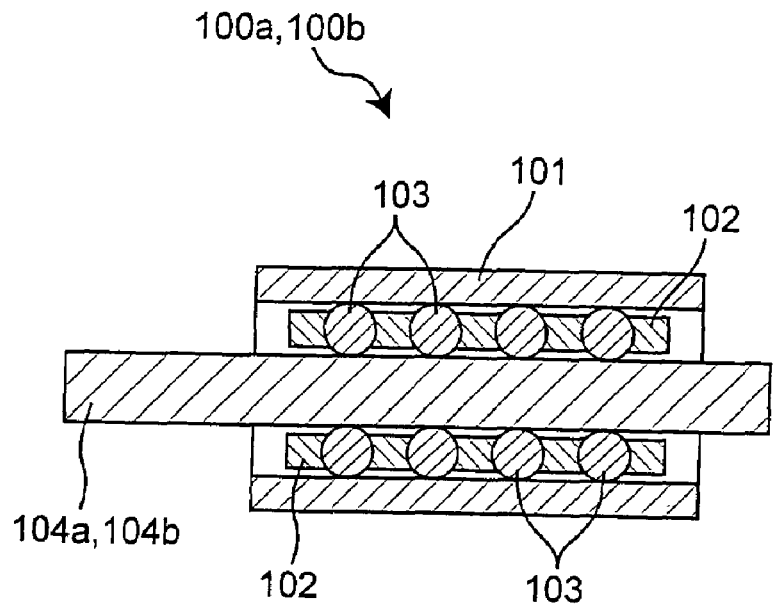
FIG. 18A is a cross-sectional side view of a linear bush in the joint driving device according to the aforementioned modified example of the fourth embodiment of the present invention.
Figure 18B:
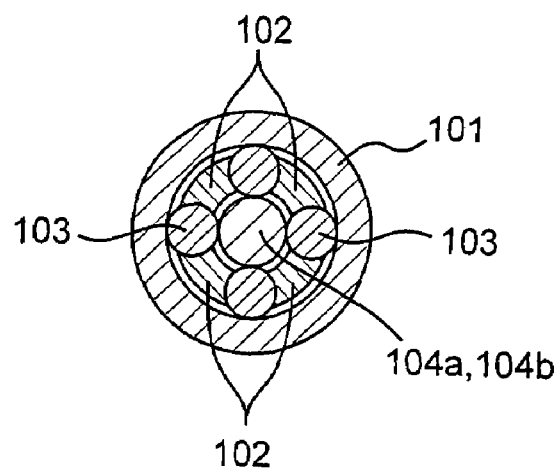
FIG. 18B is a cross-sectional front view of the linear bush in the joint driving device according to the aforementioned modified example of the fourth embodiment of the present invention.

FIGS. 13A, 13B, and 16 are views illustrating the configuration of a joint driving device according to a fourth embodiment of the present invention. The joint driving device of FIGS. 13A and 13B is different from the first embodiment in components which will be described later, while the other portions are the same as those of the first embodiment. These common components will be designated by the same reference characters as those of the first embodiment and detailed description thereof will be omitted.

In FIGS. 13A, 13B, and 16, numerals 51a and 51b are linear guides as an example of the aforementioned motion restriction portion. The linear guides 51a and 51b are constituted by rails 52a and 52b secured to the side surface of the first configuration member 1, sliders 53a and 53b which are slidably engaged with the rails 52a and 52b, and a plurality of guide balls 54 placed along a single straight line such that the guide balls 54 are rotatable between the rails 52a and 52b having a substantially rectangular-shaped cross-sectional area and the sliders 53a and 53b having a substantially C-shaped cross-section, wherein the sliders 53a and 53b can perform a relative translational motion along the rails 52a and 52b (in other words, the sliders 53a and 53b have only a single translational degree of freedom). Further, the rails 52a and 52b are secured to the side surface of the first configuration member 1 such that their center axes are in parallel with the center axis of the first configuration member 1, and the sliders 53a and 53b are secured to the sealing members 14a and 14b for the elastic body actuators 6a and 6b.

Accordingly, the translational motion of the sealing members 14a and 14b caused by contraction motion of the elastic body actuators 6a and 6b is coincident with the direction in which the linear guides 51a and 51b can relatively perform translational motion and, therefore, is not restricted. On the other hand, translational motions in other directions are restricted, since the linear guides 51a and 51b have no degree of freedom.

Further, 54a and 54b are coupling linkages which are coupled to the sealing members 14a and 14b for the elastic body actuators 6a and 6b through rotation joints 55a and 55b and also are coupled to the actuator driving-force transfer member 5 through rotation joints 55c and 55d.

Accordingly, in the fourth embodiment, one example of the motion restriction portion is constituted by the linear guides 51a and 51b and the like. Further, one example of the coupling portion is constituted by the actuator driving-force transfer member 5, the rotation joints 55c and 55d, and the like.

There will be described operations of the joint driving device having the aforementioned configuration. The operations and the like of the elastic body actuators 6a and 6b are the same as those of the aforementioned first embodiment and, therefore, description of the operations of the common components will be omitted.

The contraction motion of the elastic body actuators 6a and 6b is transferred to the actuator driving-force transfer member 5 through the coupling linkages 54a and 54b, which causes the first configuration member 1 and the second configuration member 2 to relatively swing with respect to each other about the rotational joint 3.

Figure 14A:
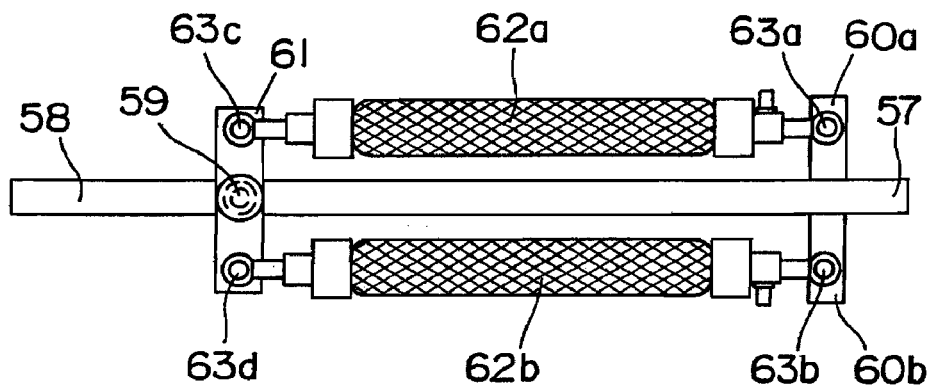
FIG. 14A is a view illustrating a configuration and an operation of a conventional joint driving device.
Figure 14B:
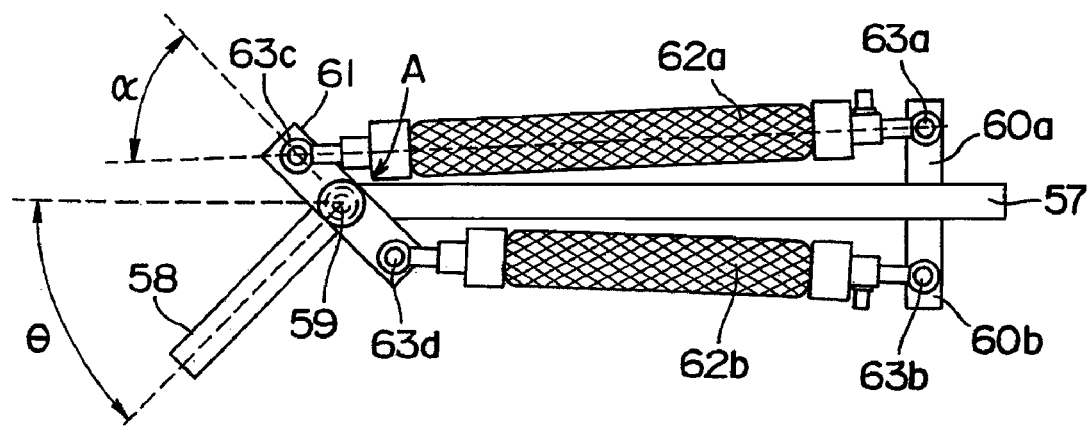
FIG. 14B is a view illustrating the configuration and the operation of the conventional joint driving device.

In this case, the joint driving device according to the fourth embodiment of the present invention is characterized in that the direction of movement of the elastic body actuators 6a and 6b is restricted by the linear guides 51a and 51b and also the driving force thereof is transferred through the coupling linkages 54a and 54b. With the aforementioned configuration, even when the swing angle θ is greater as illustrated in FIG. 13B, it is possible to overcome the issue of conventional joint driving devices that the interval between the elastic body actuators 6a and 6b is reduced to cause the elastic body actuators 6a and 6b to come into contact with the first configuration member 1 as illustrated in FIG. 14B, which makes it impossible to increase the swing angle θ.

Further, while, in the fourth embodiment, the linear guides are used as an example of the aforementioned motion restriction portion, the present invention is not limited thereto. As illustrated in FIGS. 17A, 17B, 18A, and 18B, the same advantageous effects may be obtained by employing rod-shaped members 104a and 104b, as rails, having a circular-shaped cross-sectional area which are coupled to the elastic body actuators 6a and 6b, and a mechanism such as linear bushings 100a and 100b constituted from a cylindrical-shaped slider 101 that is slidable along outer surfaces of the rod-shaped members 104a and 104b by having a plurality of guide balls 103 rotatably and undetacheably held in the ball holding device 102 rotate wherein the linear bushings 100a and 100b have a translational degree of freedom along the central axes of the rod-shaped members 104a and 104b and a rotational degree of freedom about the central axes of the rod-shaped members 104a and 104b. Further, the respective sliders 101 of the linear bushes 100a and 100b are secured to the first configuration member 1 through fixture brackets 105a and 105b.

Figure 15:
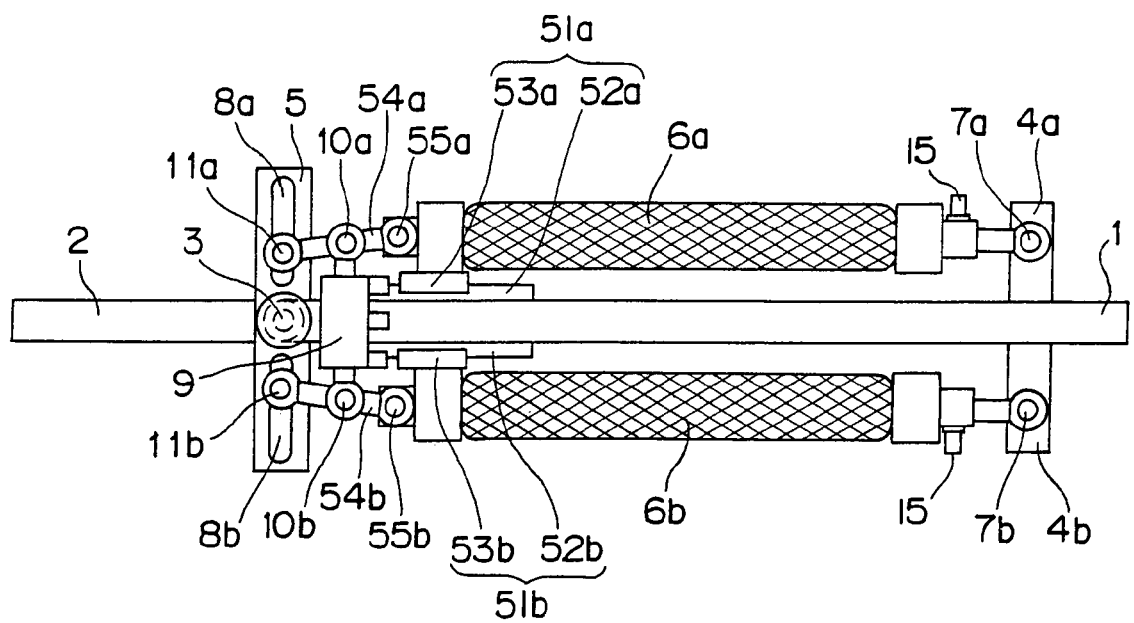
FIG. 15 is a view illustrating a configuration of a joint driving device according to a combination of the first and fourth embodiments.

By properly combining the arbitrary embodiments of the aforementioned various embodiments, the effects possessed by the embodiments can be produced. For example, as illustrated in FIG. 15, in the case of combining the first embodiment and the fourth embodiment to offer the effects of the first embodiment, it is possible to move the position at which the first elastic body actuator 6a is secured to the second configuration member 2 and the position at which the second elastic body actuator 6b is secured to the second configuration member 2, more smoothly, through the linear guides according to the fourth embodiment, thereby offering the effects of both the first and fourth embodiments.

Also, it is possible to properly combine arbitrary embodiments out of the aforementioned various embodiments to offer the effects of the respective embodiments.

The joint driving devices according to the present invention are usable as joint driving devices for a multi-joint robot arm. Also, the joint driving devices according to the present invention are usable as joint driving mechanisms for rotation mechanisms in production equipment, joint driving devices for mechanical apparatuses, and the like, without limited to the robot arm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A joint driving device comprising:
   a first configuration member;
   a second configuration member which is coupled to the first configuration member through a rotational joint and is relatively movable with respect to the first configuration member;
   a first elastic body actuator, one end portion of which is secured to the first configuration member and the other end portion of which is secured to the second configuration member;
   a second elastic body actuator, one end portion of which is secured to the first configuration member and the other end portion of which is secured to the second configuration member, such that a position at which the other end portion of the second elastic body actuator is secured to the second configuration member and a position at which the other end portion of the first elastic body actuator is secured to the second configuration member are substantially symmetric about the rotational joint; and
   a securing-position variable mechanism for changing an interval between a position of the first elastic body actuator, which is secured to the second configuration member, and a position of the second elastic body actuator, which is secured to the second configuration member,
   wherein the securing-position variable mechanism is constructed so that the first elastic body actuator and the second elastic body actuator are attached to the second configuration member so as to perform relative rotation and perform relative translational motion for changing the interval between the position of the first elastic body actuator and the position of the second elastic body actuator,
   wherein the relative translation motion is carried out approximately along a straight line passing through an axis of the rotational joint at which the first configuration member and the second configuration member are coupled to each other so as to change the interval, and
   wherein the other end portions of the first and second elastic body actuators are received in elongated openings, respectively, and the relative translation motion is carried out by moving the other end portions along the elongated openings so as to change the interval.

2. The joint driving device according to claim 1, wherein the securing-position variable mechanism is operable to change the interval between the position of the first elastic body actuator which is secured to the second configuration member and the position of the second elastic body actuator which is secured to the second configuration member to change a rotational torque generated between the first configuration member and the second configuration member.

3. The joint driving device according to claim 2, further comprising a control device for controlling the securing-position variable mechanism to change the interval between the position of the first elastic body actuator which is secured to the second configuration member and the position of the second elastic body actuator which is secured to the second configuration member to change the rotational torque generated between the first configuration member and the second configuration member.

4. The joint driving device according to claim 1, wherein the securing-position variable mechanism is operable to change the interval between the position of the first elastic body actuator which is secured to the second configuration member and the position of the second elastic body actuator which is secured to the second configuration member to change a rotational angle generated between the first configuration member and the second configuration member.

5. The joint driving device according to claim 4, further comprising a control device for controlling the securing-position variable mechanism to change the interval between the position of the first elastic body actuator which is secured to the second configuration member and the position of the second elastic body actuator which is secured to the second configuration member to change the rotational angle generated between the first configuration member and the second configuration member.

6. The joint driving device according to claim 1, wherein the securing-position variable mechanism comprises a securing-position guide mechanism for respectively guiding the secured position of the first elastic body actuator and the secured position of the second elastic body actuator in a longitudinal direction of the first configuration member, and a securing-position driving actuator for respectively causing backward-and-forward motions of the secured position of the first elastic body actuator and the secured position of the second elastic body actuator, while guiding them with the securing-position guide mechanism, to change the interval between the secured position of the first elastic body actuator and the secured position of the second elastic body actuator.

7. A joint driving device comprising:
   a first configuration member;
   a second configuration member which is coupled to the first configuration member through a rotational joint and is relatively movable with respect to the first configuration member;
   a first elastic body actuator, one end portion of which is secured to the first configuration member and the other end portion of which is secured to the second configuration member;
   a second elastic body actuator, one end portion of which is secured to the first configuration member and the other end portion of which is secured to the second configuration member, such that a position at which the other end portion of the second elastic body actuator is secured to the second configuration member and a position at which the other end portion of the first elastic body actuator is secured to the second configuration member are substantially symmetric about the rotational joint; and
   a securing-position variable mechanism for changing an interval between a position of the first elastic body actuator, which is secured to the second configuration member, and a position of the second elastic body actuator, which is secured to the second configuration member, wherein:

the securing-position variable mechanism is constructed so that the first elastic body actuator and the second elastic body actuator are attached to the second configuration member so as to perform relative rotation and perform relative translational motion for changing the interval between the position of the first elastic body actuator and the position of the second elastic body actuator, wherein:

the first elastic body actuator is secured to the second configuration member via a first elongated hole provided in one of the first elastic body actuator and the second configuration member and a member slidable along the first elongated hole provided on the other of the first elastic body actuator and the second configuration member, the second elastic body actuator is secured to the second configuration member via a second elongated hole provided in one of the second elastic body actuator and the second configuration member and a member slidable along the second elongated hole provided on the other of the second elastic body actuator and the second configuration member, and movement of the first and second elastic body actuators along the first and second elongated holes changes the interval therebetween.

8. A joint driving device comprising:

a first configuration member;

a second configuration member coupled to the first configuration member through a rotational joint such that the second configuration member and the first configuration member are rotatable relative to each other;

a first elastic body actuator having a first end portion secured to the first configuration member and a second end portion secured to the second configuration member;

a second elastic body actuator having a first end portion secured to the first configuration member and a second end portion secured to the second configuration member;

an actuator driving-force transfer member having first and second elongated openings which are disposed on opposite sides of the rotational joint, wherein the second end portion of the first elastic body actuator is connected to the first elongated opening via a first rotation joint, and the second end portion of the second elastic body actuator is connected to the second elongated opening via a second rotation joint; and an interval control actuator disposed adjacent the second end portions of the first and second elastic bodies and along a direction that is orthogonal relative to a longitudinal direction of the first configuration member, the interval control actuator including a cylinder, and first and second reciprocating piston rods protruding from opposite sides of the cylinder, wherein outer ends of the first and second piston rods are rotatably connected to the first and second elastic body actuators, respectively, wherein the interval control actuator is operable to move the rotation joints along their respective elongated openings, thereby changing a distance between rotational axes of the first and second rotation joints.

* * * * *